United States Patent
Narendran et al.

(10) Patent No.: US 12,523,367 B2
(45) Date of Patent: Jan. 13, 2026

(54) 3D PRINTED INTEGRATED THERMAL MANAGEMENT AND LIGHT TRANSFER STRUCTURES

(71) Applicant: RENSSELAER POLYTECHNIC INSTITUTE, Troy, NY (US)

(72) Inventors: Nadarajah Narendran, Clifton Park, NY (US); Jean Paul Freyssinier, Troy, NY (US); Ukwatte Lokuliyanage Indika Perera, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 18/273,100

(22) PCT Filed: Jan. 19, 2022

(86) PCT No.: PCT/US2022/012869
§ 371 (c)(1),
(2) Date: Jul. 19, 2023

(87) PCT Pub. No.: WO2022/159423
PCT Pub. Date: Jul. 28, 2022

(65) Prior Publication Data
US 2024/0085012 A1 Mar. 14, 2024

Related U.S. Application Data

(60) Provisional application No. 63/281,073, filed on Nov. 18, 2021, provisional application No. 63/139,252, filed on Jan. 19, 2021.

(51) Int. Cl.
*F21V 29/00* (2015.01)
*B33Y 80/00* (2015.01)
(Continued)

(52) U.S. Cl.
CPC .............. *F21V 29/83* (2015.01); *B33Y 80/00* (2014.12); *F21V 29/503* (2015.01); *F21Y 2115/10* (2016.08)

(58) Field of Classification Search
CPC ....... F21V 29/83; F21V 29/503; B33Y 80/00; F21Y 2115/10
See application file for complete search history.

(56) References Cited

U.S. PATENT DOCUMENTS 7,144,135 B2 * 12/2006 Martin .................... F21S 6/003
362/345
7,244,051 B2 7/2007 Bewig et al.
(Continued)

FOREIGN PATENT DOCUMENTS

CN 110467704 A 11/2019
DE 10316506 A1 * 11/2004 ............ F21V 29/505
(Continued)

OTHER PUBLICATIONS

International Search Report and The Written Opinion of the International Searching Authority, International Application No. PCT/US2022/012869, mailed Apr. 11, 2022.

*Primary Examiner* — Gerald J Sufleta, II
(74) *Attorney, Agent, or Firm* — Barclay Damon LLP; Anthony P. Gangemi

(57) ABSTRACT

One embodiment provides a luminaire. The luminaire includes a light transfer structure, and a thermal management structure. The light transfer structure is configured to receive light from at least one light emitting diode (LED). The thermal management structure is configured to manage a thermal energy of the at least one LED. The light transfer structure and the thermal management structure are formed during a same three-dimensional (3D) printing process.

20 Claims, 15 Drawing Sheets

(51) Int. Cl.
*F21V 29/503* (2015.01)
*F21V 29/83* (2015.01)
*F21Y 115/10* (2016.01)

(56) References Cited

U.S. PATENT DOCUMENTS

| | | | |
|---|---|---|---|
| 9,099,575 B2* | 8/2015 | Medendorp, Jr. | H10F 77/331 |
| 9,366,422 B2 | 6/2016 | McClure et al. | |
| 9,696,019 B2 | 7/2017 | Palfreyman et al. | |
| 9,765,949 B2 | 9/2017 | Shen et al. | |
| 10,274,161 B2 | 4/2019 | Vissenberg et al. | |
| 10,502,407 B1 | 12/2019 | Spiro | |
| 10,816,149 B2 | 10/2020 | Boonekamp et al. | |
| 10,816,168 B2 | 10/2020 | Zeman | |
| 2015/0003070 A1* | 1/2015 | Medendorp, Jr. | F21V 3/02 362/294 |
| 2015/0352792 A1* | 12/2015 | Kanada | B29C 64/393 700/98 |
| 2017/0205034 A1 | 7/2017 | Lau et al. | |
| 2017/0321852 A1 | 11/2017 | Handsaker et al. | |
| 2018/0220506 A1 | 8/2018 | Sadwick | |
| 2020/0049327 A1 | 2/2020 | Duijmelink et al. | |
| 2020/0376755 A1* | 12/2020 | Hikmet | B29C 64/188 |
| 2022/0251250 A1* | 8/2022 | Ling | B29C 64/129 |

FOREIGN PATENT DOCUMENTS

| | | |
|---|---|---|
| KR | 20200002364 A | 1/2020 |
| WO | 2020123924 A1 | 6/2020 |

\* cited by examiner

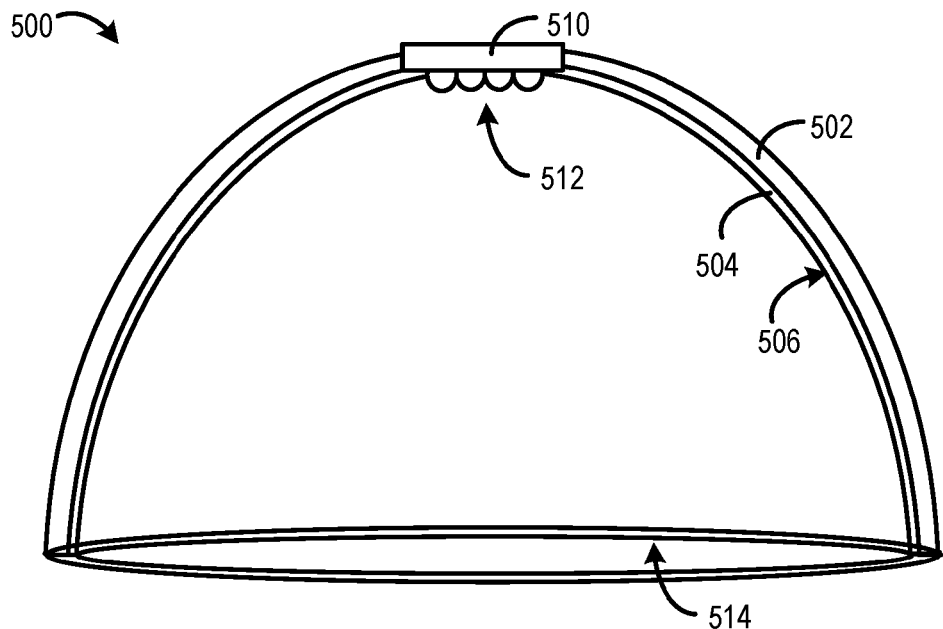
FIG. 5
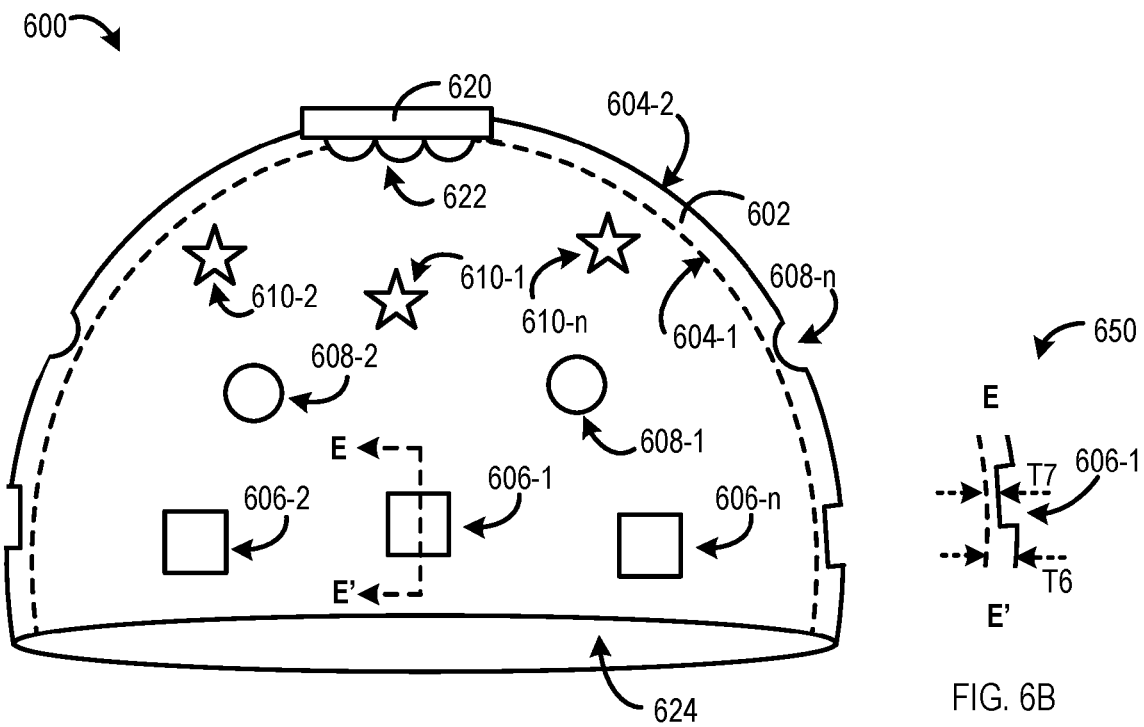
FIG. 6A
FIG. 6B

3D PRINTED INTEGRATED THERMAL MANAGEMENT AND LIGHT TRANSFER STRUCTURES

CROSS REFERENCE TO RELATED APPLICATION(S)

This application claims the benefit of U.S. Provisional Application No. 63/139,252, filed Jan. 19, 2021, and U.S. Provisional Application No. 63/281,073, filed Nov. 18, 2021, which are incorporated by reference as if disclosed herein in their entireties.

GOVERNMENT LICENSE RIGHTS

This invention was made with government support under award number EE0008722, awarded by the Department of Energy. The government has certain rights in the invention.

FIELD

The present disclosure relates to thermal management and light transfer structures, in particular to, three-dimensional (3D) printed integrated thermal management and light transfer structures.

BACKGROUND

Light emitting diode (LED) lighting fixtures (i.e., luminaires) generally contain several components. Such components may include, but are not limited to, light transfer structures (e.g., reflector, lens, diffuser, etc.), a thermal management structure (i.e., heat transfer structure, e.g., heat sink), electronics (e.g., driver, sensors, controllers, etc.), housing to encase the electronics, and other components. Traditionally, these components and assemblies may be designed and manufactured separately, and then integrated to yield the luminaire. Assembling the separately manufactured components may add cost and complexity to the manufacturing process.

SUMMARY

In some embodiments, there is provided a lighting apparatus. The lighting apparatus includes a light transfer structure and a thermal management structure. The light transfer structure is configured to receive light from at least one light emitting diode (LED). The thermal management structure is configured to manage a thermal energy of the at least one LED. The light transfer structure and the thermal management structure are formed during a same three-dimensional (3D) printing process.

In some embodiments of the lighting apparatus, the light transfer structure and the thermal management structure are combined in an integrated structure.

In some embodiments of the lighting apparatus, the thermal management structure includes at least one thermal management element configured to facilitate heat transfer from the at least one LED.

In some embodiments of the lighting apparatus, the light transfer structure is selected from the group including a reflector, a diffuser, and a lens.

In some embodiments of the lighting apparatus, at least one of the light transfer structure and/or the thermal management structure includes a decorative feature.

In some embodiments of the lighting apparatus, the thermal management structure is a heat sink.

In some embodiments of the lighting apparatus, a surface of the light transfer structure is specular or diffuse.

In some embodiments of the lighting apparatus, the thermal management structure includes at least one thermal management element. Each thermal management element includes a polymer and a plurality of thermally conductive particles.

In some embodiments of the lighting apparatus, the thermal management structure includes at least one thermal management element. Each thermal management element includes a composite material. In some embodiments of the lighting apparatus, the composite material includes a first material and a second material. The second material is configured to enhance a thermal conductivity of each thermal management element.

In some embodiments, there is provided a luminaire. The luminaire includes a light engine, a light transfer structure, and a thermal management structure. The light engine including at least one light emitting diode (LED). The light transfer structure is configured to receive light from the light engine. The thermal management structure is configured to manage a thermal energy of the light engine. The light transfer structure and the thermal management structure are formed during a same three-dimensional (3D) printing process.

In some embodiments of the luminaire, the light transfer structure and the thermal management structure are combined in an integrated structure.

In some embodiments of the luminaire, the thermal management structure includes at least one thermal management element configured to facilitate heat transfer from the light engine.

In some embodiments of the luminaire, the light transfer structure is selected from the group including a reflector, a diffuser, and a lens.

In some embodiments of the luminaire, at least one of the light transfer structure and/or the thermal management structure includes a decorative feature.

In some embodiments of the luminaire, the thermal management structure is a heat sink.

In some embodiments of the luminaire, a surface of the light transfer structure is specular or diffuse.

In some embodiments of the luminaire, the thermal management structure includes at least one thermal management element. Each thermal management element includes a polymer and a plurality of thermally conductive particles.

In some embodiments of the luminaire, the thermal management structure includes at least one thermal management element. Each thermal management element includes a composite material. In some embodiments of the luminaire, the composite material includes a first material and a second material. The second material is configured to enhance a thermal conductivity of each thermal management element.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein:

FIG. 5 is a sketch illustrating another example luminaire that includes integrated thermal management and light transfer structures, according to several embodiments of the present disclosure;

FIG. 6A is a sketch illustrating an isometric view of another example luminaire that includes integrated thermal management and light transfer structures and decorative features, according to several embodiments of the present disclosure;

FIG. 6B is a cross-section view of a decorative feature of the example luminaire of FIG. 6A;

DESCRIPTION

Figure 1A:
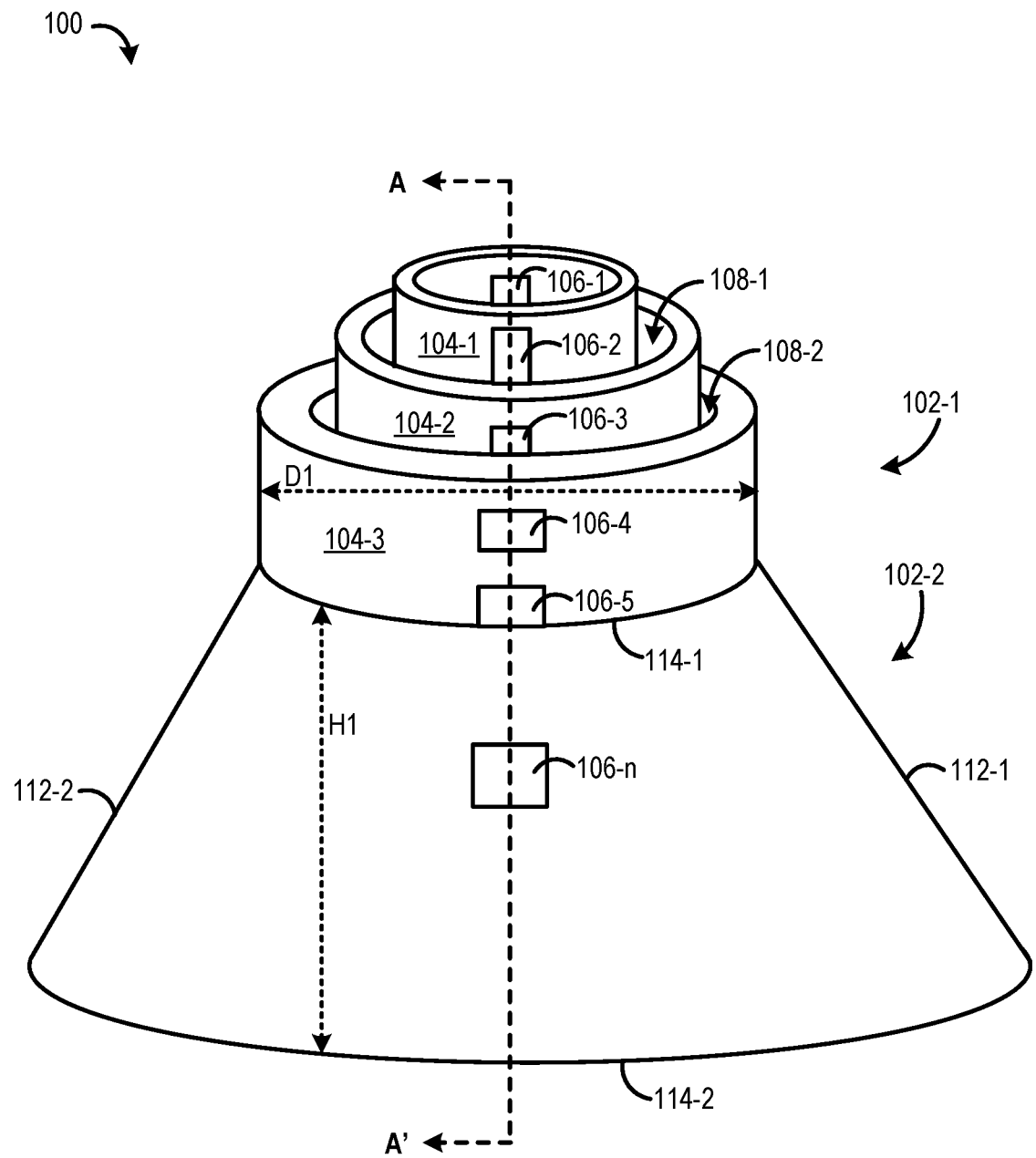
FIG. 1A is a sketch illustrating an isometric view of an example luminaire that includes integrated thermal management and light transfer structures, according to several embodiments of the present disclosure.

Generally, there is disclosed herein three-dimensional (3D) printed integrated thermal management and light transfer structures. The integrated thermal management and light transfer structures may be included in a luminaire (i.e., light fixture). The thermal management structure may include a thermal transfer structure. The thermal transfer structure may include, but is not limited to, a heat sink. The light transfer structure may include, but is not limited to, a reflector, a diffuser, a lens and/or a combination thereof.

The thermal management structure may be configured to manage a thermal output from one or more sources including, but not limited to, a light source (e.g., a light engine including one or more LED(s), drive electronics, etc.). In one nonlimiting example, the thermal management structure (e.g., heat transfer structure) may be configured to reduce a light emitting diode (LED) junction temperature or to maintain a relatively low LED junction temperature. In one nonlimiting example, the thermal management structure may include a heat sink. In another example, the thermal management structure may correspond to a heat sink.

The light transfer structure may be configured to facilitate transmission of light energy emitted by the light source, out of the luminaire and onto a lighting target. Function(s) of the light transfer structure may include, but is(are) not limited to, tailoring a beam distribution of the luminaire, i.e., beam forming (e.g., lighting application-specific beam forming), increasing efficacy of the luminaire, providing or enhancing decorative aspects of the luminaire, etc.

The thermal management structure and light transfer structure may be manufactured in a same 3D printing process. In an embodiment, the thermal management structure and light transfer structure may be separate structures manufactured into a single 3D printed component during the 3D manufacturing process. The single 3D printed component may then include a plurality of portions with at least one portion corresponding to the thermal management structure and at least one other portion corresponding to the light transfer structure. In this embodiment, the thermal management structure and light transfer structure are each configured to maintain a respective, independent functionality.

In another embodiment, the thermal management structure and light transfer structure may be combined into a same 3D printed component. In this embodiment, the thermal management structure and light transfer structure may correspond to the same 3D printed component. Combining different subassemblies into an integrated 3D printed component (i.e., integrated structure) can reduce an overall luminaire manufacturing cost. In one nonlimiting example, a reflector or diffuser (light transfer structure) may be combined with a heat sink (heat transfer structure) into a single component that can be 3D printed.

In an embodiment, there is provided a luminaire. The luminaire includes a light engine, a light transfer structure and a thermal management structure. The light engine includes at least one LED. The light transfer structure is configured to receive light from the light engine. The thermal management structure is configured to manage a thermal energy of the light engine. The light transfer structure and the thermal management structure are formed during a same three-dimensional (3D) printing process.

It may be appreciated that using 3D printing to create luminaires has many benefits including, but not limited to, being available on-demand, facilitating creation of custom luminaires, and/or on-site manufacturability. Additionally or alternatively, benefits may further include reducing a number of parts when manufacturing a luminaire that may then result in significant cost reduction. Additionally or alternatively, benefits may further include reduced labor and/or increased manufacturing consistency.

It may be appreciated that manufacturing details associated with 3D printing are 3D printer-specific and may vary according to 3D printer technology, characteristics (e.g., shape, size, etc.) of the structure(s) to be printed and/or materials used in the 3D printing process. Integrated thermal management and light transfer structures, consistent with the present disclosure, are configured to be 3D printed using an appropriate 3D printing process.

It may be appreciated that at least some thermal management structures (e.g., heat sink(s)) may be configured to transfer heat from a heat source (e.g., a light engine). Heat transfer characteristics of the thermal management structure are related to thermal characteristics (e.g., thermal conductivity) of each material included in the thermal management structure. For example, a polymer may have an associated relatively low thermal conductivity, and a metal may have an associated relatively high thermal conductivity.

In some embodiments, the thermal management structure may be 3D printed using a composite material that includes first material that has relatively low thermal conductivity and a second material that has relatively high thermal conductivity. As used herein, a relatively low thermal conductivity corresponds to thermal conductivity less than about one watt per meter-kelvin (W/(m·K), and a relatively high thermal conductivity corresponds to thermal conductivity greater than about 10 W/(m·K). As used herein, relatively low conductivity materials may include, but are not limited to, synthetic polymers (e.g., nylon, polyethylene, polyester, etc.). As used herein, relatively high conductivity materials may include, but are not limited to, metals (e.g., copper, zinc, brass, aluminum, etc.), carbon, etc. The second material may be configured to enhance the thermal conductivity of the thermal management structure. The composite material may then possess thermal characteristics suitable for the thermal management structure. The second material (i.e., the relatively high thermally conductive material) may include, but is not limited to, metal particles, nanoparticles (e.g., carbon nanotubes, metal nanoparticles), etc.

In some embodiments, a thermal management structure may include one or more thermal management elements. In one nonlimiting example, for a thermal management structure that is a heat sink, the thermal management elements may be heat sink fins. However, this disclosure is not limited in this regard. Each thermal management element, consistent with the present disclosure, may include a composite material that includes a first material and a second material. The second material may be configured to enhance a thermal conductivity of the thermal management element and, thus, the thermal management structure. In one nonlimiting example, the first material may include a polymer and the second material may include a plurality of relatively thermally conductive particles.

Thus, a thermal management structure, according to the present disclosure, is configured to be relatively thermally conductive. A target thermal conductivity may be achieved by 3D printing the thermal management structure using a single material with an appropriate thermal conductivity or a composite material with the appropriate thermal conductivity.

FIG. 1A is a sketch 100 illustrating an isometric view of an example luminaire that includes integrated thermal management and light transfer structures, according to several embodiments of the present disclosure. Example luminaire 100 includes a first thermal management structure 102-1 and a second thermal management structure 102-2. The first thermal management structure 102-1 and the second thermal management structure 102-2 may be 3D printed of a single material or a composite material, as described herein. In this example 100, the first thermal management structure 102-1 is contiguous at a bottom edge with a top edge of the second thermal management structure 102-2. As used herein, "top", "bottom", and "side" are terms of convenience configured to indicate relative position, and not necessarily orientation in space.

The first thermal management structure 102-1 includes a plurality of thermal management elements 104-1, 104-2, 104-3. Each thermal management structure 102-1, 102-2 defines at least one thermal management feature 106-1, 106-2, . . . , 106-n, 108-1, 108-2. In this example luminaire 100, a first thermal management element 104-1 defines two thermal management features 106-1, 106-2, a second thermal management element 104-2 defines one thermal management feature 106-3, and a third thermal management element 104-3 defines two thermal management features 106-4, 106-5. The second thermal management structure 102-2 defines at least one thermal management feature, e.g., thermal management feature 106-n. Each thermal management feature 106-1, 106-2, . . . , 106-n, 108-1, 108-2 may be configured to facilitate airflow, and thus thermal management, of an associated thermal energy source, e.g., light engine. As used herein, "light engine" may include a single light source (e.g., LED) or a plurality of light sources (e.g., a plurality of LEDs arranged in an LED array).

In this example 100, the first thermal management structure 102-1 has a generally cylindrical shape and the plurality of thermal management elements 104-1, 104-2, 104-3 are arranged as concentric cylinders. However, this disclosure is not limited in this regard. The first thermal management element 104-1 and the second thermal management element 104-2 are separated by a first thermal management feature 108-1. The second thermal management element 104-2 and a third thermal management element 104-3 are separated by a second thermal management feature 108-2. In one non-limiting example, the first and second thermal management features 108-1, 108-2 may correspond to voids, configured to allow or facilitate air flow to an ambient environment from the luminaire 100. Relative sizes (i.e., dimensions) of the thermal management elements and the thermal management features may be configured to facilitate thermal management functionality of the thermal management structure. For example, a heat sink may generally include thermal management elements that have a relatively high surface area and thermal management features that are relatively high volume. As is known, such a heat sink structure is configured to facilitate heat sinking functionality of the heat sink.

In some embodiments, a shape of the first thermal management structure 102-1, and/or shape(s) of one or more of the thermal management elements 104-1, 104-2, and/or 104-3, may be cylindrical, ellipsoidal, rectangular, square, or free-form shaped. In some embodiments, the first thermal management structure 102-1, and/or one or more of the thermal management elements 104-1, 104-2, and/or 104-3, may have a non-uniform cross section, may include segments of equal or unequal lengths, and/or may include one or more random geometries. It may be appreciated that the 3D printing process facilitates implementing a broad range of geometries for the first thermal management structure 102-1, and one or more of the thermal management elements 104-1, 104-2, and/or 104-3.

The second thermal management structure 102-2 has a generally truncated conical (i.e., frustum conical) shape. However, this disclosure is not limited in this regard. The second thermal management structure 102-2 has a first side boundary 112-1, a second side boundary 112-2, a top boundary 114-1, and a bottom boundary 114-2. The top boundary 114-1 corresponds to the top edge of the second thermal management structure 102-2 and the bottom edge of the first thermal management structure 102-1. In this example 100, the top boundary 114-1 and the third thermal management element 104-3 have a diameter, D1, and the second thermal management structure 102-2 has a height, measured between the top boundary 114-1 and the bottom boundary 114-2, of H1. In this example 100, the height is uniform, however, this disclosure is not limited in this regard, thus, in other examples, the height may vary.

The first side boundary and the second side boundary 112-1, 112-2, extend between the top boundary 114-1 at the first thermal management structure 102-1 and the bottom boundary 114-2. The first side boundary and the second side boundary 112-1, 112-2, in this example, are generally linear. However, this disclosure is not limited in this regard. The top boundary 114-1 and the bottom boundary 114-2 have a generally curved shape. However, this disclosure is not limited in this regard. In some embodiments, the first side boundary and the second side boundary 112-1, 112-2 may have a generally curved shape (e.g., convex, concave, parabolic), may be non-uniform and/or may be freeform, and/or may include and/or define one or more decorative feature(s). In some embodiments, the top boundary 114-1 and the bottom boundary 114-2 may be linear, may be non-uniform, and/or may include and/or define one or more decorative feature(s). It may be appreciated that the 3D printing process facilitates implementing a broad range of geometries for the second thermal management structure 102-2, and one or more of the first side boundary 112-1, the second side boundary 112-2, the top boundary 114-1 and/or the bottom boundary 114-2.

In this example 100, each thermal management feature 106-1, 106-2, . . . , **106-*n* has a generally rectangular shape. In some embodiments, the thermal management features 106-1, 106-2, . . . , 106-*n* may be generally circular, ellipsoidal, square, asymmetric, hexagonal, octagonal, random, etc. As used herein, "generally" when applied geometric shapes means to within manufacturing tolerances. In some embodiments, one or more of the thermal management features 106-1, 106-2, . . . , and/or 106-*n*** may be decorative.

Figure 1B:
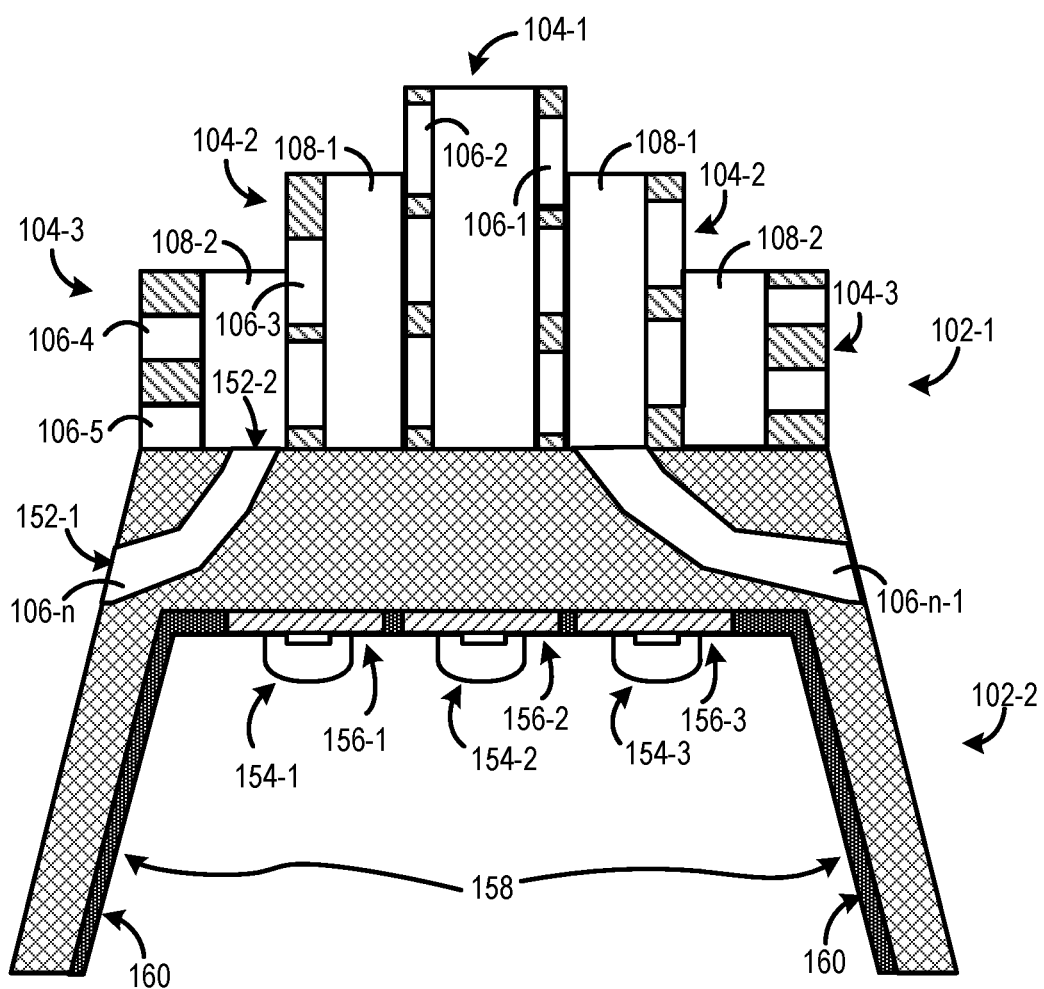
FIG. 1B is a cross-section view of the example luminaire of FIG. 1A.

FIG. 1B is a cross-section A-A' view 150 of the example luminaire 100 of FIG. 1A. Luminaire cross-section 150 includes the first thermal management structure 102-1 and the second thermal management structure 102-2, as well as corresponding elements and features described with respect to luminaire 100 of FIG. 1A. Luminaire cross-section 150 further illustrates thermal management features 106-1, 106-2, 106-3, 106-4, and 106-5 that, in this example 150, correspond to slots or cavities defined in the corresponding thermal management elements 104-1, 104-2, 104-3.

Luminaire 150 further includes thermal management features **106-*n*-1, and 106-*n* that, in this example 150, correspond to channels defined in the second thermal management structure 102-2. Channel 106-*n* has a first end 152-1 and an opposing second end 152-2. The first end 152-1 corresponds to an opening defined in the second thermal management structure 102-2. The second end 152-2 corresponds to an opening defined in the second thermal management structure 102-2 that is aligned with the first thermal management feature 108-1 defined in the first thermal management structure 102-1. The second end 152-2 is contiguous with the top edge of the second thermal management structure 102-2 that is contiguous with the bottom edge of the first thermal management structure 102-1. The thermal management features 106-*n*-1, 106-*n* are configured to facilitate transfer of thermal energy between the second thermal management structure 102-2 and the first thermal management structure 102-1. In one nonlimiting example, channels 106-*n*-1, 106-*n*, may facilitate transfer of thermal energy via convection. For example, ambient air may enter channel 106-*n* at the first end 152-1 and may exit the channel 106-*n* at the second end 152-2**.

Luminaire 150 further includes a plurality of light sources 154-1, 154-2, 154-3. In one nonlimiting example, the light sources may be LEDs. This example luminaire 150 includes three light sources, however, more or fewer light sources may be included in luminaire 150, within the scope of the present disclosure. As used herein, the plurality of light sources corresponds to a light engine. Luminaire 150 further includes respective drive electronics 156-1, 156-2, 156-3 associated with each light source 154-1, 154-2, 154-3. The second thermal management structure 102-2 and first thermal management structure 102-1 may then be configured to manage thermal energy produced by the light sources 154-1, 154-2, 154-3 and/or the drive electronics 156-1, 156-2, 156-3. The thermal management may be facilitated by channels **106-*n*-1, 106-*n*. For example, channels 106-*n*-1, 106-*n* may correspond to internal air passages configured to facilitate convective cooling of the first thermal management structure 102-1 and thermal management elements 104-1, 104-2, 104-3**.

Luminaire 150 further includes a light transfer structure 158. Light transfer structure 158 may include, but is not limited to, a coating, and/or a sheet insert. In an embodiment, the light transfer structure 158 may be 3D printed generally simultaneously with the second thermal management structure 102-2. Light transfer structure 158 has a surface 160 opposing the thermal management structure 102-2. Light transfer structure surface 160 has a surface characteristic configured to manage the transfer of light emitted from the light sources and out of the luminaire 150. In one nonlimiting example, the surface characteristic may be provided by a finish. For example, the finish may be relatively highly specular. In another example, the finish may be diffuse. The light transfer structure 158 is configured to receive light emitted from the light sources 154-1, 154-2, 154-3 and to transfer the received light out of the luminaire 150. Characteristics of the transferred light may be related to surface characteristics of the light transfer structure 158, e.g., whether the surface 160 is specular, diffuse, or a combination thereof. In some embodiments, the light transfer structure 158 and corresponding surface 160 may be configured to beam form the light exiting the luminaire 150. In some embodiments, the beam forming may be related to a lighting target, e.g., work space, art work, etc.

Thus, example luminaire 100, 150 may include a light transfer structure, e.g., light transfer structure 158, and a thermal management structure, e.g., thermal management structures 102-1, 102-2, that may be formed during a same 3D printing process.

Figure 2A:
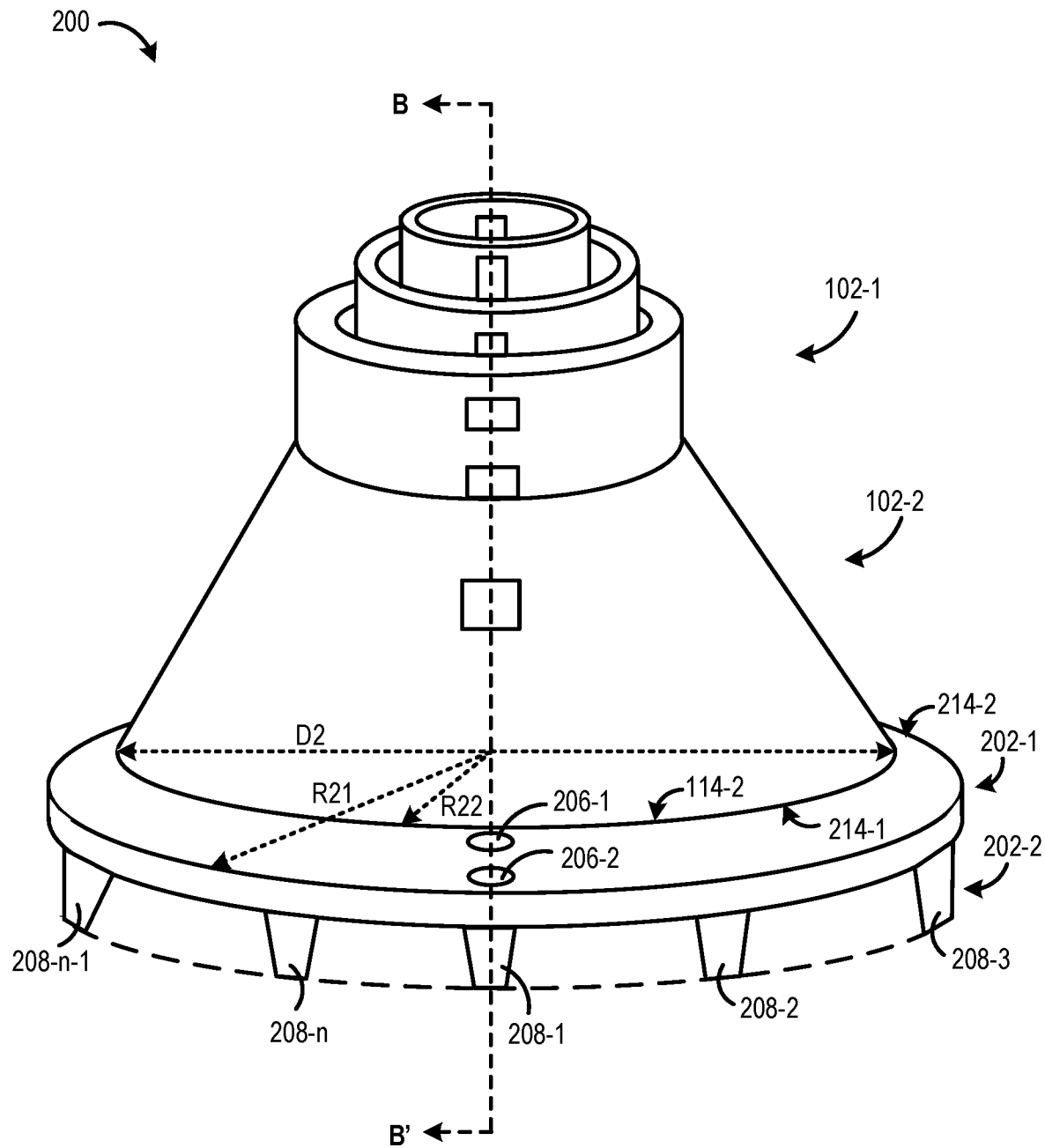
FIG. 2A is a sketch illustrating an isometric view of another example luminaire that includes integrated thermal management and light transfer structures, according to several embodiments of the present disclosure.

FIG. 2A is a sketch 200 illustrating an isometric view of another example luminaire that includes integrated thermal management and light transfer structures, according to several embodiments of the present disclosure. Example luminaire 200 includes first and second thermal management structures 102-1, 102-2, as described herein. Example luminaire 200 further includes a third thermal management structure 202-1 and a fourth thermal management structure 202-2. The third thermal management structure 202-1 and the fourth thermal management structure 202-2 may be 3D printed of a single material or a composite material, as described herein. The third thermal management structure 202-1 is coupled to the second thermal management structure 102-2 at or near the bottom boundary 114-2. In this example 200, the bottom boundary 114-2 has a diameter, D2.

In this example 200, the third thermal management structure 202-1 has a generally annular shape with an outer annulus radius, R21, and an inner annulus radius, R22. However, this disclosure is not limited in this regard. An inner boundary 214-1 of the third thermal management structure 202-1 generally corresponds to the bottom boundary 114-2 of the second thermal management structure 102-2. An outer boundary 214-2 of the third thermal management structure 202-1 extends outside the bottom boundary 114-2 of the second thermal management structure 102-2. The third thermal management structure 202-1 defines a plurality of thermal management features 206-1, 206-2. The thermal management features 206-1, 206-2 may include, but are not limited to, voids, slots, holes, etc. The thermal management features 206-1, 206-2 are configured to facilitate airflow, and thus thermal management, of an associated thermal energy source, e.g., LED(s) and/or light engine.

The fourth thermal management structure 202-2 includes a plurality of thermal management elements 208-1, 208-2, ..., 208-n-1, 208-n, coupled to, and in thermal communication with, the third thermal management structure 202-1. The plurality of thermal management elements 208-1, 208-2, ..., 208-n-1, 208-n may be distributed about the third thermal management structure 202-1, along a surface of the third thermal management structure, opposing the second thermal management structure 102-2. The plurality of thermal management elements 208-1, 208-2, ..., 208-n-1, 208-n may be configured to facilitate flow of thermal energy from the luminaire 200. In some embodiments, the thermal management elements 208-1, 208-2, ..., 208-n-1, 208-n may include and/or may correspond to decorative features.

Figure 2B:
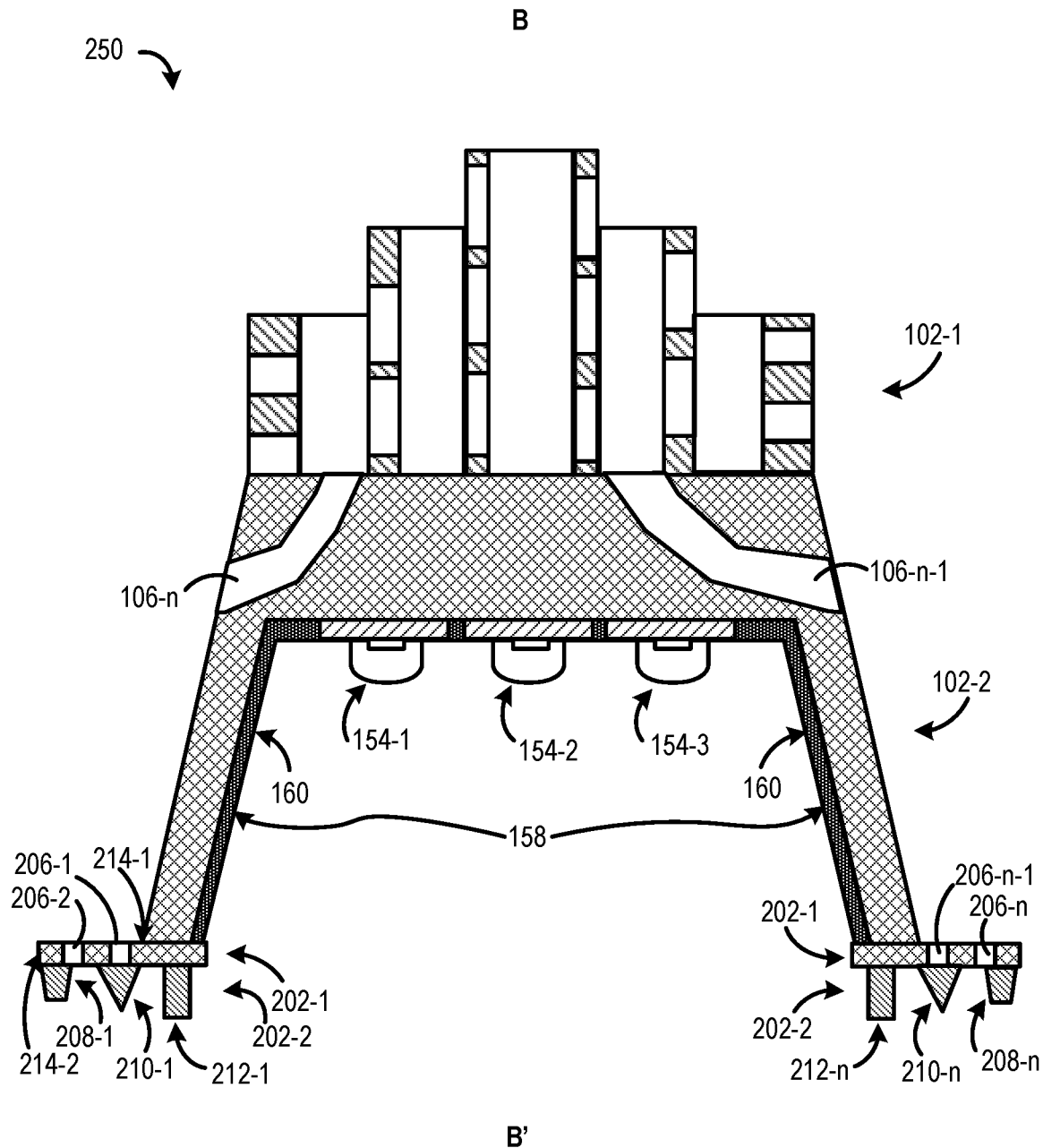
FIG. 2B is a cross-section view of the example luminaire of FIG. 2A.

FIG. 2B is a cross-section B-B' view 250 of the example luminaire 200 of FIG. 2A. Luminaire cross-section 250 includes the first thermal management structure 102-1 and the second thermal management structure 102-2, as described herein. Luminaire cross-section 250 further includes the third thermal management structure 202-1 and the fourth thermal management structure 202-2, as well as corresponding elements and features described with respect to luminaire 200 of FIG. 2A.

The third thermal management structure 202-1 further defines a plurality of thermal management features 206-n-1, 206-n. The thermal management features 206-n-1, 206-n may include, but are not limited to, voids, slots, holes, etc. The thermal management features 206-n-1, 206-n are configured to facilitate airflow, and thus thermal management, of an associated thermal energy source, e.g., LEDs 154-1, 154-2, 154-3. The fourth thermal management structure 202-2 includes a plurality of thermal management elements 210-1, ..., 210-n, 212-1, ..., 212-n. A first group of thermal management elements 208-1, ..., 208-n may have a generally trapezoidal cross-section. A second group of thermal management elements 210-1, ..., 210-n may have a generally triangular cross section. A third group of thermal management elements 212-1, ..., 212-n may have a generally rectangular cross-section. However, this disclosure is not limited in these regards. The first group 208-1, ..., 208-n may be generally positioned along the outer edge 214-2 of the annular third thermal management structure 202-1. The third group 212-1, ..., 212-n may be generally positioned along the inner edge 214-1 of the annular third thermal management structure 202-1. The second group 210-1, ..., 210-n may generally be positioned between the first group and the third group. The thermal management elements 208-1, ..., 208-n, 210-1, ..., 210-n, 212-1, ..., 212-n may be configured to facilitate transfer of thermal energy from luminaire 250. Additionally or alternatively, the thermal management elements may correspond to, and/or be configured to provide, decorative features.

Thus, example luminaire 200, 250 may include a light transfer structure, e.g., light transfer structure 158, and a thermal management structure, e.g., thermal management structures 102-1, 102-2, 202-1, 202-2 that may be formed during a same 3D printing process. In some embodiments, at least a portion of the thermal management elements included in the thermal management structures may be configured to provide decoration.

Figure 3A:
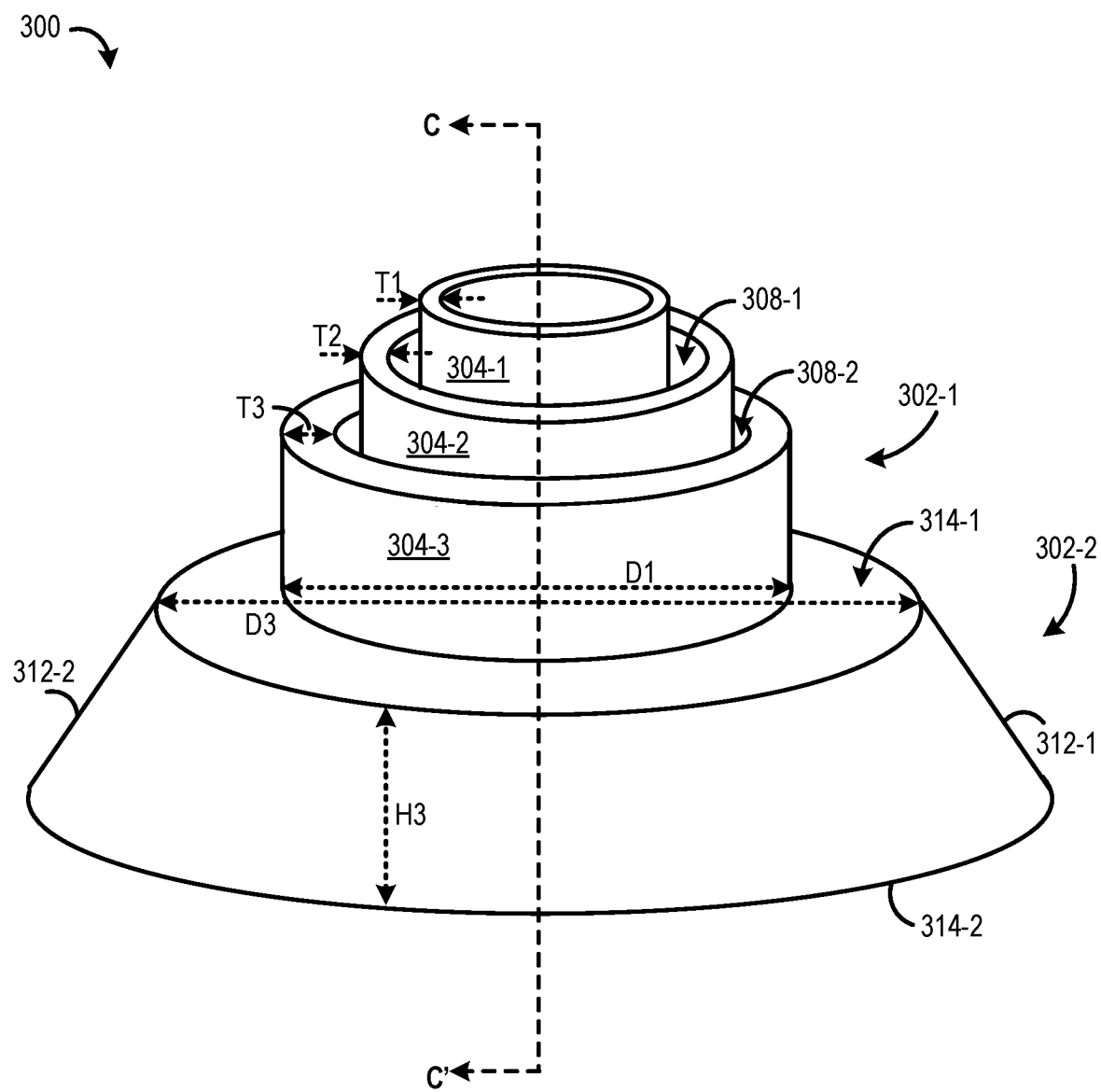
FIG. 3A is a sketch illustrating an isometric view of an example luminaire that includes integrated thermal management and light transfer structures, according to several embodiments of the present disclosure.

FIG. 3A is a sketch 300 illustrating an isometric view of an example luminaire that includes integrated thermal management and light transfer structures, according to several embodiments of the present disclosure. Example luminaire 300 includes a first thermal management structure 302-1 and a second thermal management structure 302-2. The first thermal management structure 302-1 and the second thermal management structure 302-2 may be 3D printed of a single material or a composite material, as described herein. The first thermal management structure 302-1 includes a plurality of thermal management elements 304-1, 304-2, 304-3.

In this example 300, the first thermal management structure 302-1 has a generally cylindrical shape and the plurality of thermal management elements 304-1, 304-2, 304-3 are arranged as concentric cylinders. However, this disclosure is not limited in this regard. A first thermal management element 304-1 has a wall thickness of T1. A second thermal management element 304-2 has a wall thickness of T2. A third thermal management element 304-3 has an outer diameter, D1, and a wall thickness of T3. In some embodiments, the wall thicknesses T1, T2, T3 may be equal. In some embodiments, one or more of the wall thicknesses may not be equal to one or more other wall thickness(es). The wall thickness(es) T1, T2, and/or T3 may be related to thermal management characteristics of thermal management structure 302-1. For example, the wall thicknesses may be related to a rate of transfer of thermal energy from the first thermal management structure 302-1.

The first thermal management element 304-1 and the second thermal management element 304-2 are separated by a first thermal management feature 308-1. The second thermal management element 304-2 and the third thermal management element 304-3 are separated by a second thermal management feature 308-2. In one nonlimiting example, the first and second thermal management features 308-1, 308-2 may correspond to voids, configured to allow or facilitate air flow to an ambient environment from the luminaire 300.

In some embodiments, the first thermal management structure 302-1, and/or one or more of the thermal management elements 304-1, 304-2, and/or 304-3, may be cylindrical, ellipsoidal, rectangular, or square shaped. In some embodiments, the first thermal management structure 302-1, and/or one or more of the thermal management elements 304-1, 304-2, and/or 304-3, may have a non-uniform cross section, may include segments of equal or unequal lengths, and/or may include one or more random geometries. It may be appreciated that the 3D printing process facilitates implementing a broad range of geometries for the first thermal management structure 302-1, and one or more of the thermal management elements 304-1, 304-2, and/or 304-3.

The second thermal management structure 302-2 has a generally truncated conical (i.e., frustum conical) shape. However, this disclosure is not limited in this regard. The second thermal management structure 302-2 has a first side boundary 312-1, a second side boundary 312-2, a top surface 314-1, and a bottom boundary 314-2. The top surface 314-1 corresponds to a top boundary of the second thermal management structure 302-2. In this example 300, the top surface 314-1 has a generally circular shape with a diameter, D3. The diameter, D3, of the top surface 314-1 is greater than the diameter, D1, of the third thermal element 304-3. The second thermal management structure 302-2 has a height, H3, measured between the top surface 314-1 and the bottom boundary 314-2. It may be appreciated that the height H3 is less than the corresponding height, H1, of example luminaire 100, 150, of FIGS. 1A and 1B. In this example 300, the height, H3, is uniform, however, this disclosure is not limited in this regard, thus, in other examples, the height, H3, may vary.

The first side boundary and the second side boundary 312-1, 312-2, extend between the top surface 314-1 and the bottom boundary 314-2. The first side boundary 312-1 and the second side boundary 312-2 are generally linear. However, this disclosure is not limited in this regard. The top surface 314-1 and the bottom boundary 314-2 have a generally curved shape. However, this disclosure is not limited in this regard. In some embodiments, the first side boundary 312-1 and the second side boundary 312-2 may have a generally curved shape (e.g., convex, concave, parabolic), may be non-uniform and/or may be freeform, and/or may include and/or define one or more decorative feature(s). In some embodiments, the bottom boundary 314-2 may be linear, may be non-uniform, and/or may include and/or define one or more decorative feature(s). It may be appreciated that the 3D printing process facilitates implementing a broad range of geometries for the second thermal management structure 302-2, and one or more of the first side boundary 312-1, the second side boundary 312-2, the top surface 314-1 and/or the bottom boundary 314-2.

Figure 3B:
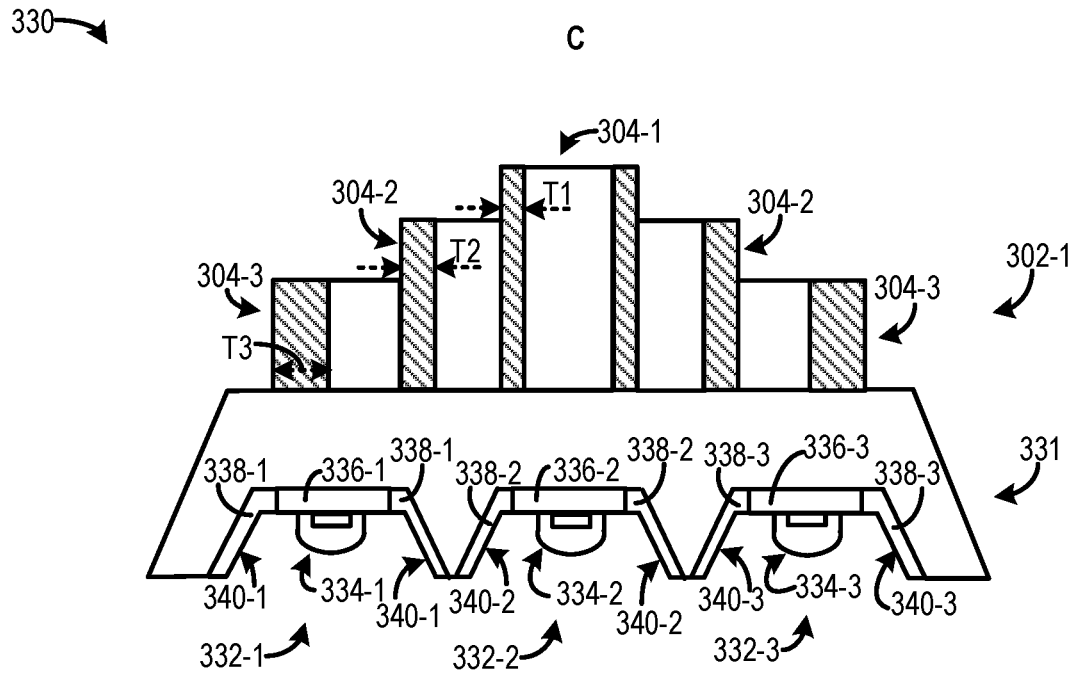
FIGS. 3B and 3C are two example cross-section views that correspond to the example luminaire of FIG. 3A.
Figure 3C:
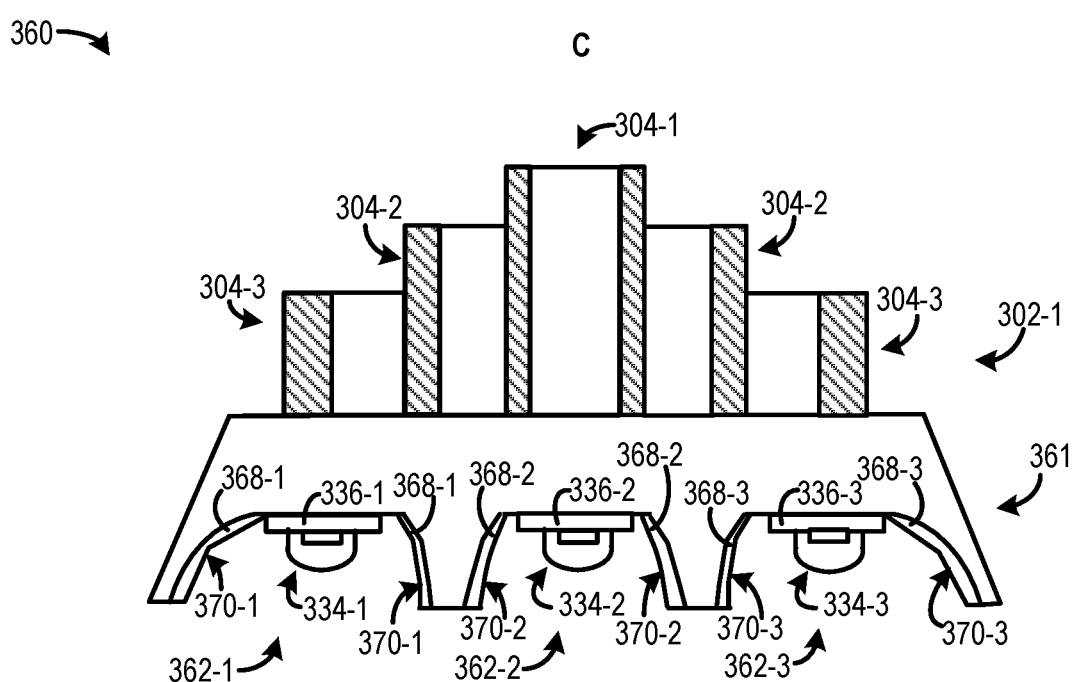

FIGS. 3B and 3C are two example 330, 360 cross-section C-C' views that correspond to the example luminaire 300 of FIG. 3A. A first example luminaire 330 is configured to illustrate generally uniform and linear light transfer elements. A second example luminaire 360 is configured to illustrate non-uniform and/or nonlinear light transfer elements. The following description may be best understood when considering the first example luminaire 330 and the second example luminaire 360 together. The first example luminaire 330 includes the first thermal management structure 302-1 and a second thermal management structure 331. The second example luminaire 360 includes the first thermal management structure 302-1 and a third thermal management structure 361. The second thermal management structure 331 is one example of the second thermal management structure 302-2 of FIG. 3. The third thermal management structure 361 is another example of second thermal management structure 302-2.

Example luminaire 330 includes a plurality of light subassemblies 332-1, 332-2, 332-3. Each light subassembly 332-1, 332-2, 332-3 includes a respective light source 334-1, 334-2, 334-3, respective drive electronics 336-1, 336-2, 336-3, and a respective light transfer structure 338-1, 338-2, 338-3. Each light transfer structure 338-1, 338-2, 338-3 has a respective surface 340-1, 340-2, 340-3, opposing the second thermal management structure 331. Similarly, example luminaire 360 includes a plurality of light subassemblies 362-1, 362-2, 362-3. Each light subassembly 362-1, 362-2, 362-3 includes a respective light source 334-1, 334-2, 334-3, respective drive electronics 336-1, 336-2, 336-3, and a respective light transfer structure 368-1, 368-2, 368-3. Each light transfer structure 368-1, 368-2, 368-3 has a respective surface 370-1, 370-2, 370-3, opposing the third thermal management structure 361. Each light source 334-1, 334-2, 334-3, may correspond to light source 154-1 and each drive electronics 336-1, 336-2, 336-3, may correspond to drive electronics 156-1, as described herein.

Each light subassembly 332-1, 332-2, 332-3 of luminaire 330 includes a generally linear and generally uniform light transfer structure, e.g., light subassembly 332-1 includes light transfer structure 338-1. Each light subassembly 362-1, 362-2, 362-3 of luminaire 360 includes a respective, generally nonlinear (e.g., curved) light transfer structure 368-1, 368-2, 368-3. Additionally or alternatively, the light transfer structures 368-1, 368-2, 368-3 may be non-uniform. As used herein, "non-uniform", when used in reference to a plurality of light transfer structures included in a luminaire, means geometries and, thus light transfer characteristics, may differ between at least some of the plurality of light transfer structures. The nonlinear and/or non-uniform light transfer structures may be configured to facilitate the beam forming for, for example, a selected lighting application.

Thus, example luminaires 300, 330, 360 may include a thermal management structure, e.g., thermal management structures 302-1, 302-2, 331-2, 361-2, and a light transfer structure, e.g., light transfer structures 338-1, 338-2, 338-3, 368-1, 368-2, 368-3, that may be formed during a same 3D printing process.

Figure 4A:
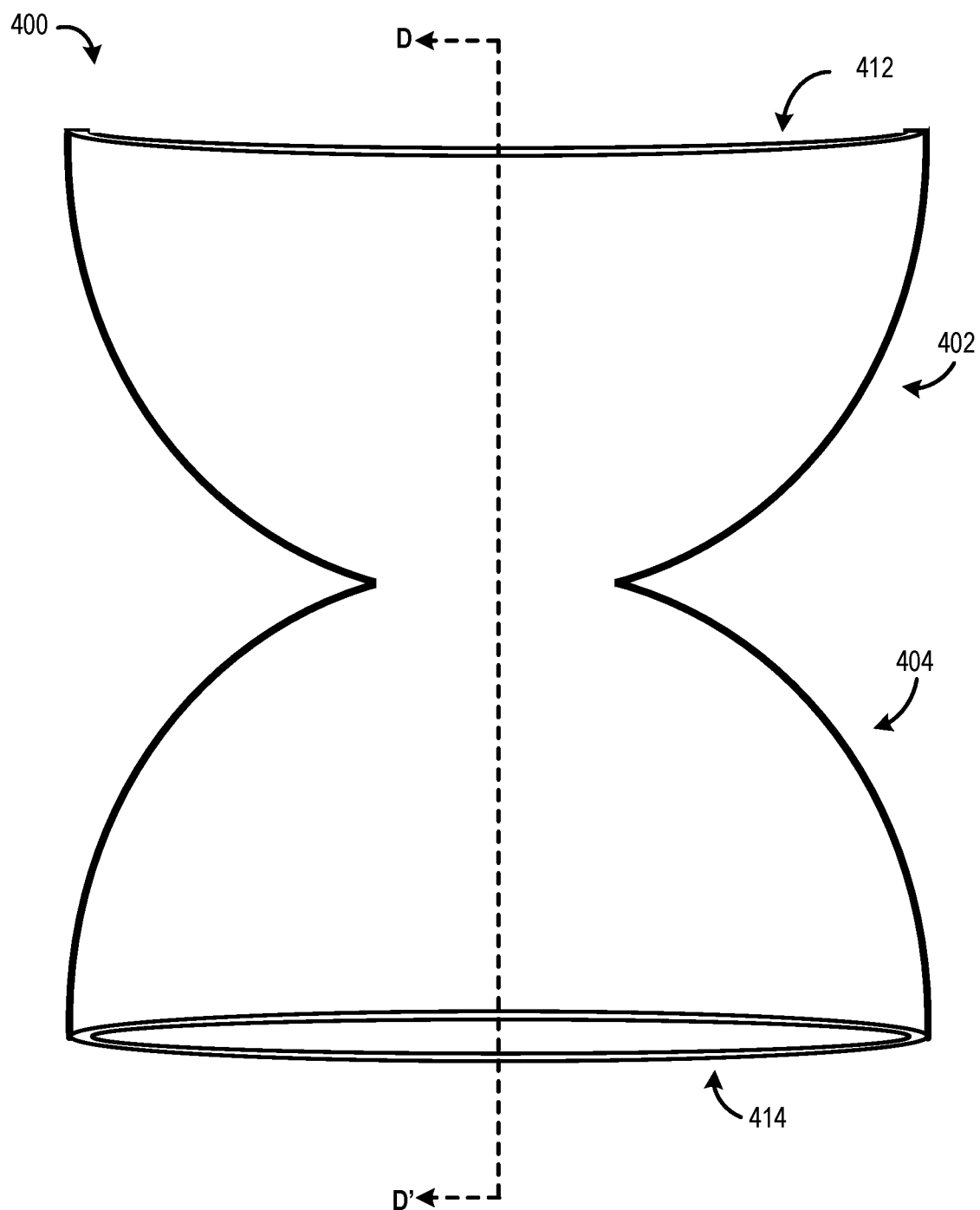
FIG. 4A is a sketch illustrating an outline view of an example luminaire that includes integrated thermal management and light transfer structures, according to several embodiments of the present disclosure.

FIG. 4A is a sketch 400 illustrating an outline view of an example luminaire that includes integrated thermal management and light transfer structures, according to several embodiments of the present disclosure. Example luminaire 400 includes a first thermal management structure 402 and a light transfer structure 404. The first thermal management structure 402 may be 3D printed of a single material or a composite material, as described herein. In this example 400, the first thermal management structure 402 is separate from and coupled to the light transfer structure 404. In one nonlimiting example, the first thermal management structure 402 is contiguous at a bottom edge of the first thermal management structure 402 with a top edge of the light transfer structure 404. The first thermal management structure 402 defines a top opening 412, and the light transfer structure 404 defines an opposing bottom opening 414.

In an embodiment, the luminaire 400 may be oriented with the top opening 412 "up", and the bottom opening 414 "down", i.e., with the top opening 412 positioned above the bottom opening 414. For example, the top opening 412 may be configured to emit heat, and the bottom opening 414 may be configured to emit light. In other words, the top opening 412 may be "heat-emitting", and the bottom opening 414 may be "light-emitting". However, this disclosure is not limited in this regard.

Figure 4B:
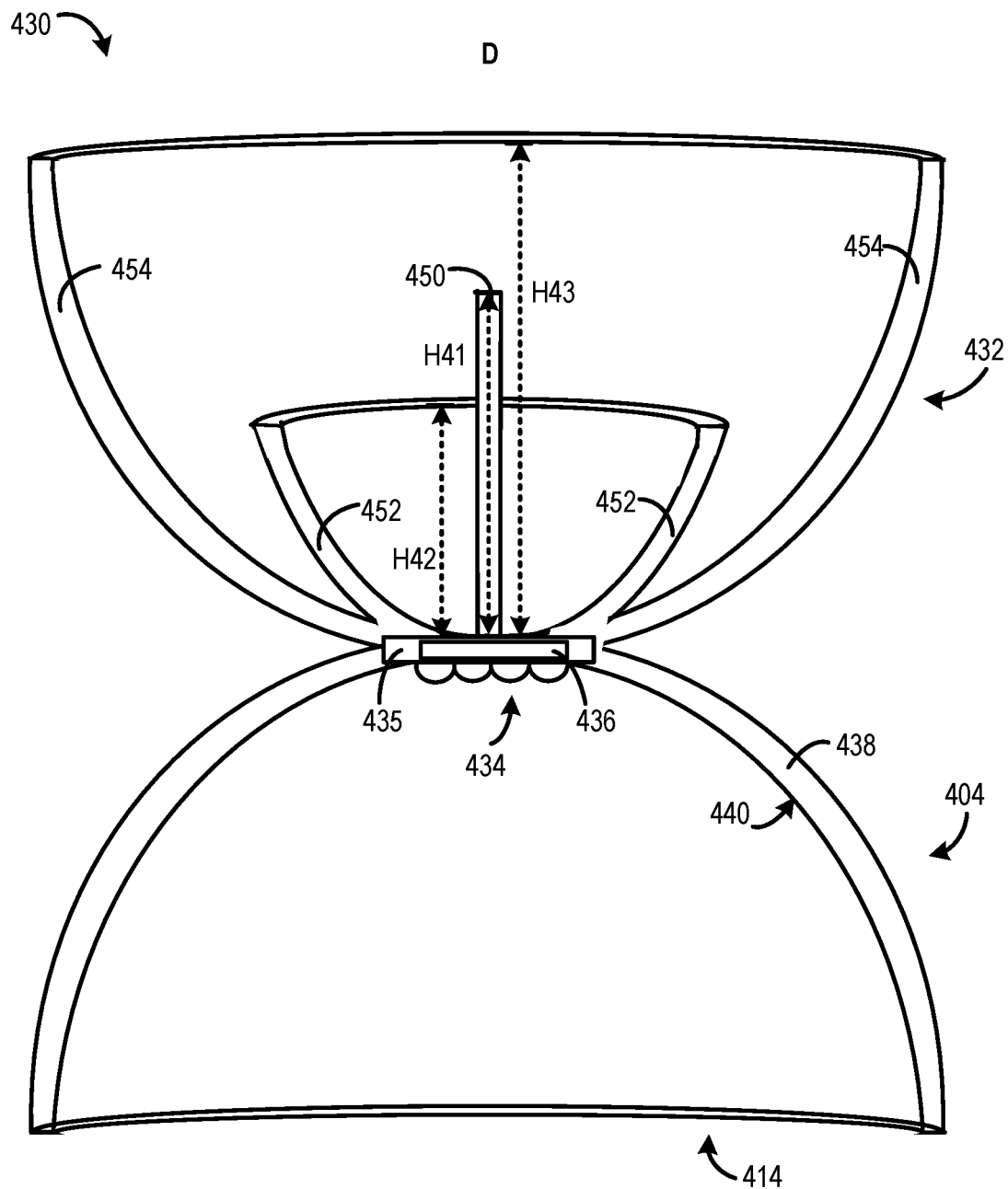
FIGS. 4B and 4C are two example cross-section views that correspond to the example luminaire of FIG. 4A.
Figure 4C:
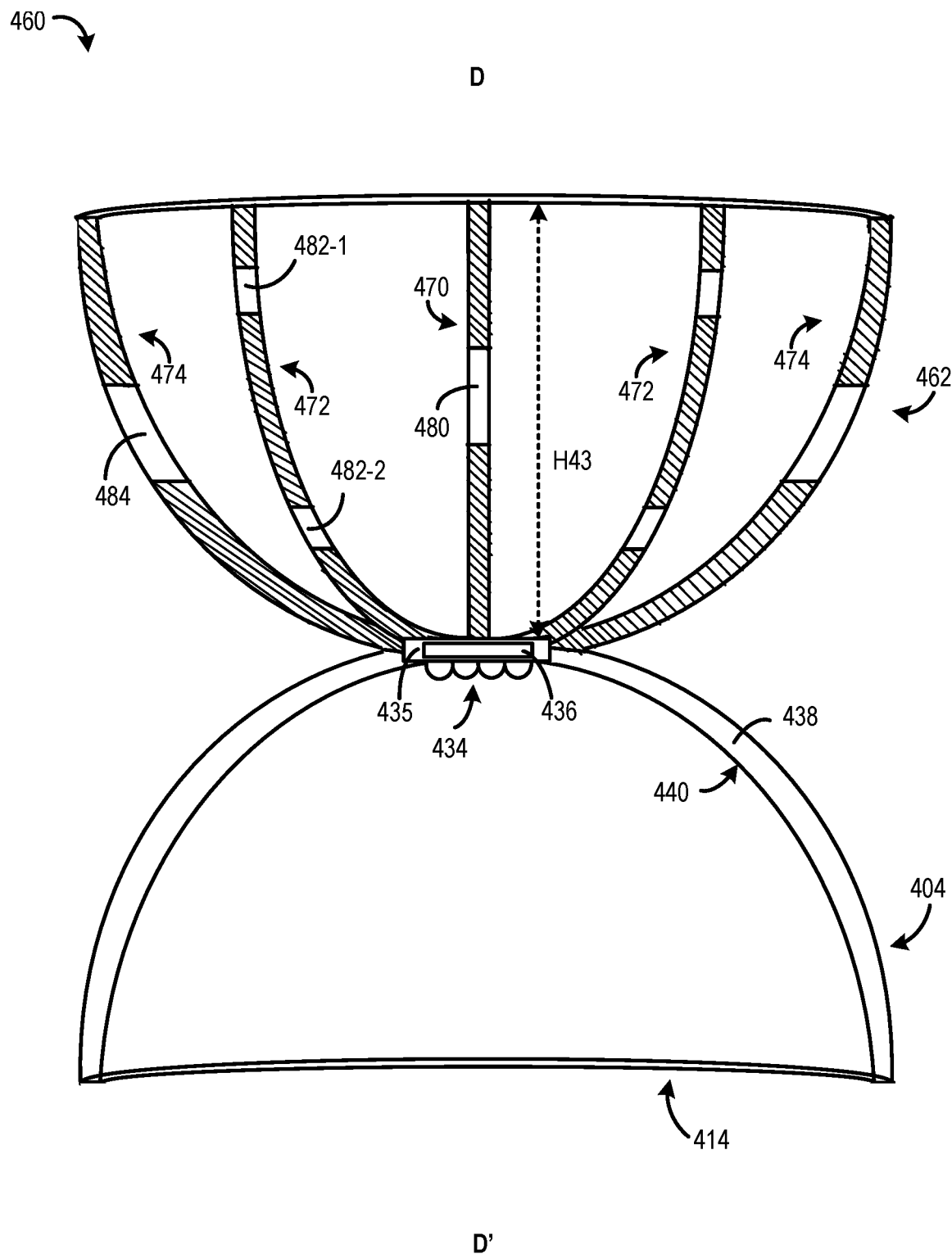

FIGS. 4B and 4C are two example cross-section D-D' views 430, 460 that correspond to the example luminaire 400 of FIG. 4A. Luminaire cross-sections 430, 460 include the light transfer structure 404. Luminaire cross-section 430 includes a second thermal management structure 432. The second thermal management structure 432 is one example of the first thermal management structure 402 of FIG. 4A. Luminaire cross-section 460 includes a third thermal management structure 462. The third thermal management structure 462 is another example of the first thermal management structure 402 of FIG. 4A.

Example luminaire 430 and example luminaire 460 each includes a light engine 434, a mounting structure 435, and drive electronics 436. The light transfer structure 404 is configured to receive light emitted from light engine 434 and to transfer the received light out of the luminaire 430, 460. The light transfer structure 404 includes a light transfer element 438 and may include a light transfer feature 440. The light transfer structure 404 may be transparent, partially transparent, translucent, opaque, and/or a combination thereof. The light transfer feature 440 may correspond to an inner surface of the light transfer structure 404 and, thus, an inner surface of the light transfer element 438. The light transfer feature 440 may be specular or diffuse, as described herein.

Turning now to FIG. 4B, the second thermal management structure 432 includes a plurality of thermal management elements 450, 452, and 454. The plurality of thermal management elements 450, 452, 454 may be positioned generally symmetrically within the second thermal management structure 432. The second thermal management structure 432 may have a height, H43. A first thermal management element 450 may correspond to an elongate member with a long axis generally parallel to a vertical direction, and a height, H41. A second thermal management element 452 has a generally parabolic shape, and a height, H42. A third thermal management element 454 has a generally hemispherical shape, and a height, H43. In some embodiments, one or more of the thermal management elements 450, 452, and/or 454, may have a different shape including, but not limited to, cylindrical, hemispherical, rectangular, freeform, etc. In some embodiments, the third thermal management element 454 may correspond to a decoration or may include a decorative feature.

The thermal management elements 450, 452, 454 may be arranged generally concentrically and the third thermal management element 452 may form an outer surface of the second thermal management structure 432. In an embodiment, the heights H41, H42, H43 may be equal. In another embodiment, two or more heights may be unequal. In one nonlimiting example, the thermal management elements 450, 452, 454 may correspond to heat sink fins.

Turning now to FIG. 4C, the second thermal management structure 462 includes a plurality of thermal management elements 470, 472, and 474. The plurality of thermal management elements 470, 472, 474 may be positioned generally symmetrically within the third thermal management structure 462. The third thermal management structure 462, and the plurality of thermal management elements 470, 472, 474 may have a height, H43. A first thermal management element 470 may correspond to an elongate member with a long axis generally parallel to a vertical direction. A second thermal management element 472 has a generally parabolic shape. A third thermal management element 474 has a generally hemispherical shape. The thermal management elements 470, 472, 474 may be arranged generally concentrically and the third thermal management element 472 may form an outer surface of the third thermal management structure 462. In an embodiment, the heights of the thermal management elements 470, 472, 474 may be equal. In another embodiment, two or more heights may be unequal.

In one nonlimiting example, the thermal management elements 470, 472, 474 may correspond to heat sink fins.

In some embodiments, each thermal management element 470, 472, 474, may define one or more thermal management features configured to facilitate thermal management, as described herein. For example, the first thermal management element 470 defines a first thermal management feature 480, the second thermal management element 472 defines a plurality of thermal management features, e.g., thermal management features 482-1, 482-2, and the third thermal management element 474 defines a plurality of thermal management features, e.g., thermal management feature 484. The thermal management features may be configured to facilitate airflow.

Thus, each example luminaire 400, 430, 460 may include a light transfer structure, e.g., light transfer structure 404, and a respective thermal management structure 402, 432, 462. In these examples 400, 430, 460, the light transfer structure 404 is coupled to the respective thermal management structure 402, 432, 462 at or near the light engine 434 by the mounting structure 435. Thus, light may be emitted in a direction different from a flow direction of corresponding thermal energy. The light transfer structure 404, respective thermal management structure 402, 432, 462, and mounting structure 435 may be formed during a same 3D printing process. In some embodiments, at least a portion of the thermal management elements included in the thermal management structures may be configured to provide decoration.

FIG. 5 is a sketch illustrating another example 500 luminaire that includes integrated thermal management and light transfer structures, according to several embodiments of the present disclosure. Example luminaire 500 includes a thermal management structure 502 and a light transfer structure 504. The thermal management structure 502 may be 3D printed of a single material or a composite material, as described herein. In this example 500, the thermal management structure 502 is contiguous with, and/or may be combined with, the light transfer structure 504.

Example luminaire 500 includes drive electronics 510, and a light engine 512. The thermal management structure 502 and light transfer structure 504 define an opening 514. The light transfer structure 504 is configured to receive light emitted from light engine 512 and to transfer the received light out of the luminaire 500. The light transfer structure 504 may include a light transfer feature 506. The light transfer structure 504 may be transparent, partially transparent, translucent, opaque, and/or a combination thereof. The light transfer feature 506 may correspond to an inner surface of the light transfer structure 504. The light transfer feature 506 may be specular or diffuse, as described herein.

Thus, luminaire 500 may correspond to a consolidated structure that includes a thermal management structure 502 combined with a light transfer structure 504. The thermal management structure and combined light transfer structure 504 may be formed during a same 3D printing process.

FIG. 6A is a sketch 600 illustrating an isometric view of another example luminaire that includes integrated thermal management and light transfer structures and decorative features, according to several embodiments of the present disclosure. FIG. 6B is a cross-section E-E' view 650 of a decorative feature 606-1 of the example luminaire of FIG. 6A. FIGS. 6A and 6B may be best understood when considered together.

Example luminaire 600 includes a combined thermal management and light transfer structure 602. The thermal management portion of the combined thermal management light transfer structure 602 may be 3D printed of a single material or a composite material, as described herein. The combined structure 602 has an inner surface 604-1 and an opposing outer surface 604-2. In an embodiment, the inner surface 604-1 may correspond to a light transfer surface and may be specular or diffuse, as described herein.

Example luminaire 600 includes drive electronics 620, and a light engine 622. The combined structure 602 defines an opening 624. The combined structure 602 is configured to receive light emitted from light engine 622 and to transfer the received light out of the luminaire 600. The combined structure 602 includes a plurality of decorative features 606-1, 606-2, . . . , 606-n, 608-1, 608-2, . . . , 608-n, 610-1, 610-2, . . . , 610-n, distributed over the combined structure 602. The outer surface 604-2 may define one or more of the decorative features. The decorative features 606-1, 606-2, . . . , 606-n, 608-1, 608-608-n, 610-1, 610-2, . . . , 610-n may have a variety of shapes. In one nonlimiting example, a first group of decorative features includes a plurality of generally rectangular-shaped features 606-1, 606-2, . . . , 606-n; a second group of decorative features includes a plurality of generally circular shaped features 608-1, 608-2, . . . , 608-n; and a third group of decorative features includes a plurality of generally star-shaped features 610-1, 610-2, . . . , 610-n. However, this disclosure is not limited in this regard. The combined structure 602 and/or one or more of the decorative features 606-1, 606-2, . . . , 606-n, 608-1, 608-2, . . . , 608-n, 610-1, 610-2, . . . , 610-n may be transparent, partially transparent, translucent, opaque, and/or a combination thereof.

In an embodiment, one or more of the decorative features, e.g., a first decorative feature 606-1, may correspond to a reduced thickness of the combined structure 602. As used herein, "thickness" corresponds to a distance between the inner surface 604-1 and the outer surface 604-2 of the combined structure 602. Cross-section 650 illustrates one nonlimiting example of a reduced thickness of the combined structure 602 corresponding to the first decorative feature 606-1. The combined structure 602 has a thickness T6 in areas that do not include decorative features and a thickness T7 over a surface of at least some of the decorative features, e.g., the first decorative feature 606-1. The thickness T7 is less than the thickness T6. It may be appreciated that an effect of lesser thickness of the first decorative feature 606-1 is that relatively more light energy may be emitted at the decorative feature 606-1 compared to a surrounding region of the combined structure 602. The relatively greater light emission at the first decorative feature 606-1 may then be perceived as brighter than the surrounding region of the combined structure, providing an aesthetic benefit.

Thus, luminaire 600 may include a combined thermal management and light transfer structure 602 that includes a plurality of decorative features. The combined structure and decorative features may be formed during a same 3D printing process.

Figure 7:
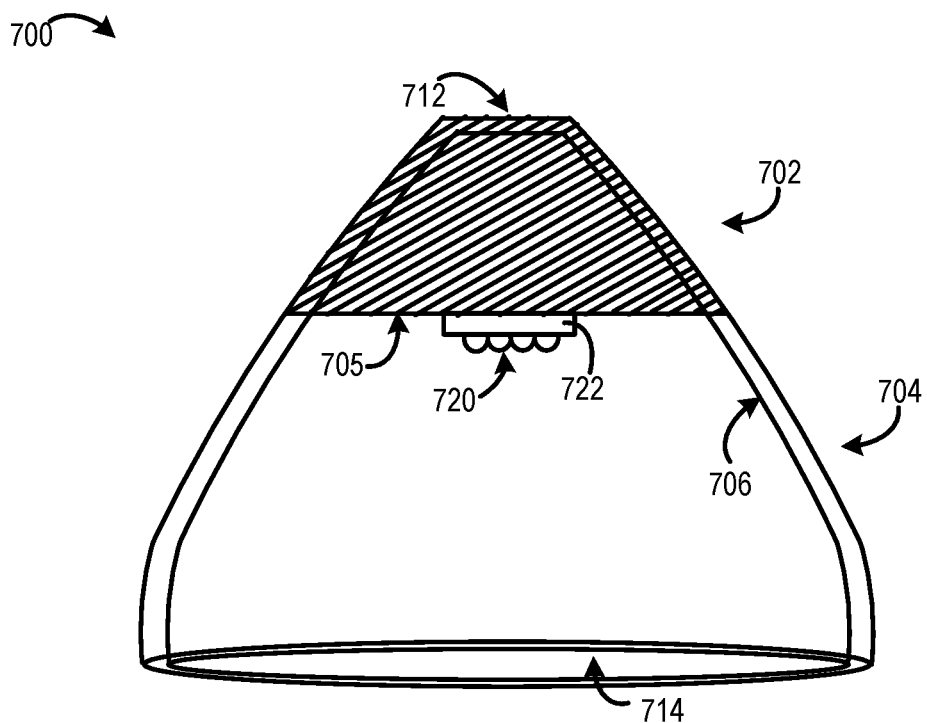
FIG. 7 is a sketch illustrating another example luminaire that includes integrated thermal management and light transfer structures, according to several embodiments of the present disclosure.

FIG. 7 is a sketch 700 illustrating another example luminaire that includes integrated thermal management and light transfer structures, according to several embodiments of the present disclosure. Example luminaire 700 includes a thermal management structure 702 and a light transfer structure 704. The thermal management structure 702 may be 3D printed of a single material or a composite material, as described herein. In this example 700, the thermal management structure 702 is separate from and coupled to the light transfer structure 704. In one nonlimiting example, the thermal management structure 702 is contiguous at a bottom edge 705 with a top edge of the light transfer structure 704. The thermal management structure 702 may define a top opening 712, and the light transfer structure 704 defines an opposing bottom opening 714.

Example luminaire 700 includes a light engine 720 coupled to drive electronics 722. The thermal management structure 702 may be configured to transfer thermal energy from light engine 720 and/or drive electronics 722 out of the luminaire 700 via, for example, the top opening 712. The light transfer structure 704 is configured to receive light emitted from light engine 720 and to transfer the received light out of the luminaire 700. The light transfer structure 704 may include a light transfer feature 706. The light transfer structure 704 may be transparent, partially transparent, translucent, opaque, and/or a combination thereof. The light transfer feature 706 may correspond to an inner surface of the light transfer structure 704. The light transfer feature 706 may be specular or diffuse, as described herein. The light transfer structure 704 and/or light transfer feature 706 may be configured to beam form light emitted from the light engine 720, as described herein.

Thus, example luminaire 700 may include a light transfer structure 704, and a thermal management structure 702. The light transfer structure 704, and thermal management structure 702 may be formed during a same 3D printing process.

Figure 8:
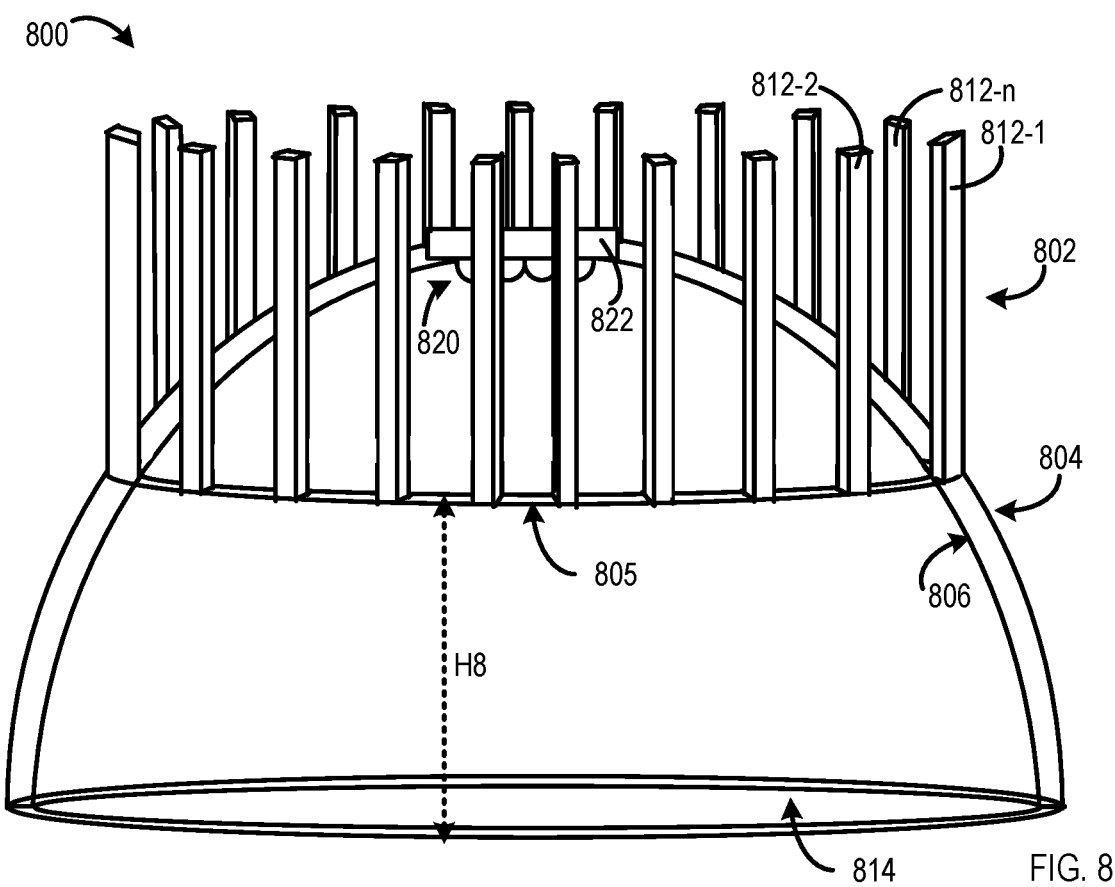
FIG. 8 is a sketch illustrating another example luminaire that includes integrated thermal management and light transfer structures, according to several embodiments of the present disclosure.

FIG. 8 is a sketch 800 illustrating another example luminaire that includes integrated thermal management and light transfer structures, according to several embodiments of the present disclosure. Example luminaire 800 includes a first thermal management structure 802 and a combined second thermal management and light transfer structure 804. The first thermal management structure 802 and thermal management portion of the combined second thermal management and light transfer structure 804 may be 3D printed of a single material or a composite material, as described herein. In this example 800, the first thermal management structure 802 is coupled to the combined structure 804. In one nonlimiting example, the first thermal management structure 802 is contiguous at a bottom edge 805 with the combined structure 804. The combined structure 804 defines a bottom opening 814 opposing the bottom edge 805 of the first thermal management structure 802.

The first thermal management structure 802 includes a plurality of thermal management elements 812-1, 812-2, . . . , 812-n. In one nonlimiting example, the plurality of thermal management elements 812-1, 812-2, . . . , 812-n may each correspond to an elongate member with a long axis oriented generally vertically. The plurality of thermal management elements 812-1, 812-2, . . . , 812-n may be generally uniformly distributed about a generally horizontal circumference of the combined structure 804, corresponding to the bottom edge 805 of the first thermal management structure 802. The bottom edge 805 may be positioned a distance, H8, from the bottom opening 814.

Example luminaire 800 includes a light engine 820 coupled to drive electronics 822. The first thermal management structure 802 and combined structure 804 may be configured to transfer thermal energy produced by the light engine 820 and/or drive electronics 822 from the luminaire 800. The combined structure 804 may be further configured to receive light emitted from light engine 820 and to transfer the received light out of the luminaire 800. The combined structure 804 may include a light transfer feature 806. The combined structure 804 may be transparent, partially transparent, translucent, opaque, and/or a combination thereof. The light transfer feature 806 may correspond to an inner surface of the combined structure 804. The light transfer feature 806 may be specular or diffuse, as described herein.

The combined structure 804 and/or light transfer feature 806 may be configured to beam form light emitted from the light engine 820, as described herein.

Thus, example luminaire 800 may include a combined structure 804, and a first thermal management structure 802. The combined structure 804, and first thermal management structure 802 may be formed during a same 3D printing process.

Figure 9:
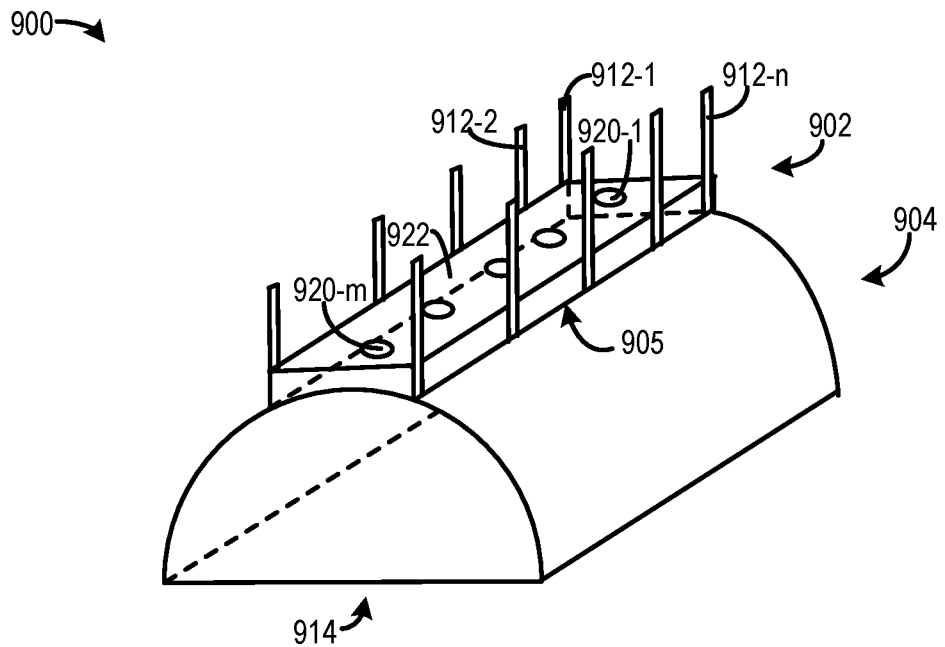
FIG. 9 is a sketch illustrating another example luminaire that includes integrated thermal management and light transfer structures, according to several embodiments of the present disclosure.

FIG. 9 is a sketch 900 illustrating another example luminaire that includes integrated thermal management and light transfer structures, according to several embodiments of the present disclosure. Example luminaire 900 includes a thermal management structure 902 and a light transfer structure 904. The thermal management structure 902 may be 3D printed of a single material or a composite material, as described herein. In this example 900, the thermal management structure 902 is coupled to the light transfer structure 904. In one nonlimiting example, the thermal management structure 902 is contiguous at a bottom edge 905 with the light transfer structure 904. The light transfer structure 904 defines a bottom opening 914 opposing the bottom edge 905 of the thermal management structure 902. In one nonlimiting example, the light transfer structure 904 may have a half-circle cross section, i.e., may define a generally half-cylinder-shaped volume. In another example, the light transfer structure 904 may have a parabolic or a free-form cross-section.

The thermal management structure 902 includes a plurality of thermal management elements 912-1, 912-2, ..., 912-$n$. In one nonlimiting example, the plurality of thermal management elements 912-1, 912-2, ..., 912-$n$ may each correspond to an elongate member with a long axis oriented generally vertically. The plurality of thermal management elements 912-1, 912-2, ..., 912-$n$ may be generally uniformly distributed about a generally horizontal outer perimeter of the thermal management structure 902.

Example luminaire 900 includes a plurality of light sources 920-1, ..., 920-$m$ included in and/or coupled to a base structure 922 (that may include drive electronics, as described herein). The thermal management structure 902 may be configured to transfer thermal energy produced by the plurality of light sources 920-1, ..., 920-$m$ (and/or drive electronics) from the luminaire 900. The light transfer structure 904 is configured to receive light emitted from plurality of light sources 920-1, ..., 920-$m$ and to transfer the received light out of the luminaire 900. The light transfer structure 904 may be transparent, partially transparent, translucent, opaque, and/or a combination thereof. The light transfer structure 904 may be configured to beam form light emitted from the plurality of light sources 920-1, ..., 920-$m$. For example, luminaire 900 may be configured to illuminate a relatively broad area, e.g., a workspace, retail space, etc.

Thus, example luminaire 900 may include a light transfer structure 904, and a thermal management structure 902. The light transfer structure 904, and thermal management structure 902 may be formed during a same 3D printing process.

Figure 10:
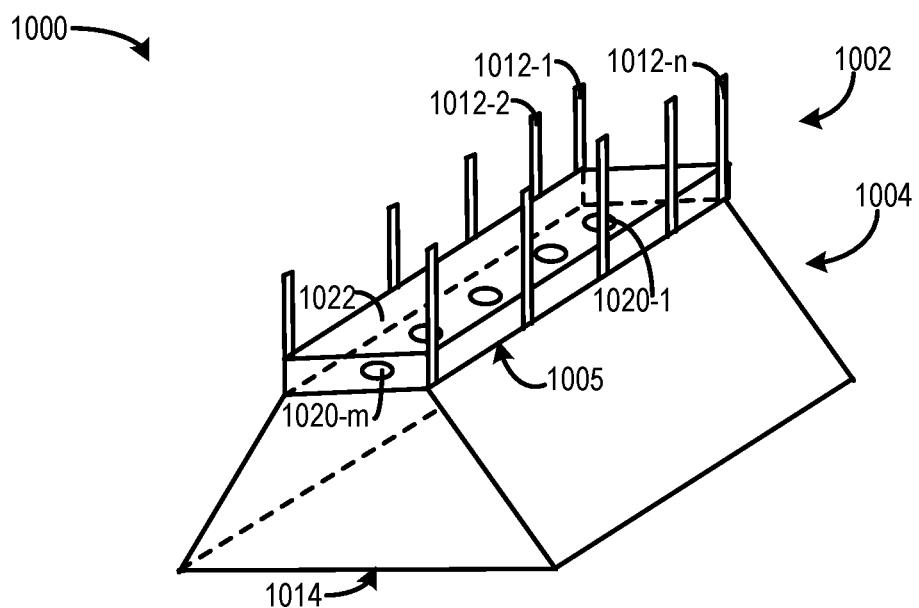
FIG. 10 is a sketch illustrating another example luminaire that includes integrated thermal management and light transfer structures, according to several embodiments of the present disclosure.

FIG. 10 is a sketch 1000 illustrating another example luminaire that includes integrated thermal management and light transfer structures, according to several embodiments of the present disclosure. Example luminaire 1000 includes a thermal management structure 1002 and a light transfer structure 1004. The thermal management structure 1002 may be 3D printed of a single material or a composite material, as described herein. In this example 1000, the thermal management structure 1002 is coupled to the light transfer structure 1004. In one nonlimiting example, the thermal management structure 1002 is contiguous at a bottom edge 1005 with the light transfer structure 1004. The light transfer structure 1004 defines a bottom opening 1014 opposing the bottom edge 1005 of the thermal management structure 1002. In one nonlimiting example, the light transfer structure 1004 may have a trapezoidal cross section. In another example, the light transfer structure 1004 may have a generally rectangular cross section.

The thermal management structure 1002 includes a plurality of thermal management elements 1012-1, 1012-2, ..., 1012-$n$. In one nonlimiting example, the plurality of thermal management elements 1012-1, 1012-2, ..., 1012-$n$ may each correspond to an elongate member with a long axis oriented generally vertically. The plurality of thermal management elements 1012-1, 1012-2, ..., 1012-$n$ may be generally uniformly distributed about a generally horizontal outer perimeter of the thermal management structure 1002.

Example luminaire 1000 includes a plurality of light sources 1020-1, ..., 1020-$m$ included in and/or coupled to a base structure 1022 (that may include drive electronics, as described herein). The thermal management structure 1002 may be configured to transfer thermal energy produced by the plurality of light sources 1020-1, ..., 1020-$m$ (and/or drive electronics) from the luminaire 1000. The light transfer structure 1004 is configured to receive light emitted from plurality of light sources 1020-1, ..., 1020-$m$ and to transfer the received light out of the luminaire 1000. The light transfer structure 1004 may be transparent, partially transparent, translucent, opaque, and/or a combination thereof. The light transfer structure 1004 may be configured to beam form light emitted from the plurality of light sources 1020-1, ..., 1020-$m$. For example, luminaire 1000 may be configured to illuminate a relatively broad area, e.g., a workspace, retail space, etc.

Thus, example luminaire 1000 may include a light transfer structure 1004, and a thermal management structure 1002. The light transfer structure 1004, and thermal management structure 1002 may be formed during a same 3D printing process.

Figure 11A:
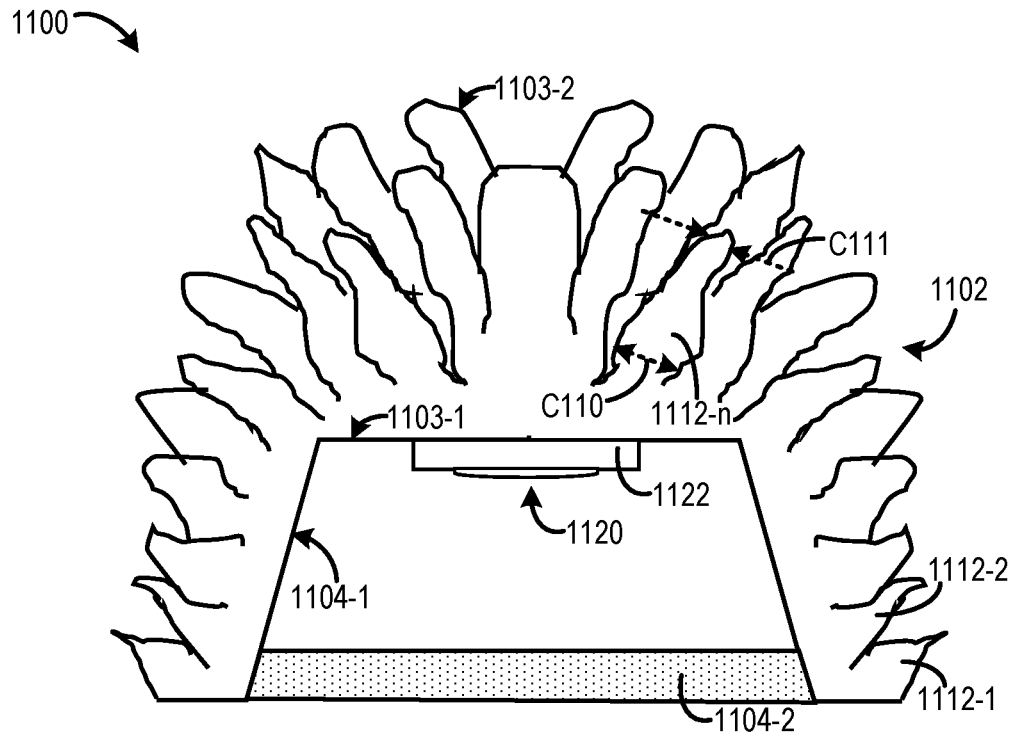
FIG. 11A is a sketch of a cross-section view of another example luminaire that includes integrated thermal management and light transfer structures, according to several embodiments of the present disclosure.

FIG. 11A is a sketch 1100 of a cross-section view of another example luminaire that includes integrated thermal management and light transfer structures, according to several embodiments of the present disclosure. Example luminaire 1100 includes a thermal management structure 1102, a first light transfer structure 1104-1, and a second light transfer structure 1104-2. The thermal management structure 1102 may be 3D printed of a single material or a composite material, as described herein. The thermal management structure 1102 has a generally uniform inner surface 1103-1 and a non-uniform outer surface 1103-2. In this example 1100, the first light transfer structure 1104-1 may be combined with the thermal management structure 1102, e.g., may correspond to or be contiguous with the inner surface 1103-1 of the thermal management structure 1102.

The thermal management structure 1102 includes a plurality of thermal management elements 1112-1, 1112-2, ..., 1112-$n$. Each thermal management element 1112-1, 1112-2, ..., 1112-$n$ may be generally free-form. In some embodiments, at least some thermal management elements may be substantially solid 1112-1, 1112-2, ..., and/or 1112-$n$. In some embodiments, at least some thermal management elements may be generally hollow 1112-1, 1112-2, ..., and/or 1112-$n$. In some embodiments, at least some thermal management elements, e.g., thermal management element 1112-$n$, may have a first cross-section C110 that has a size greater than a second cross-section C111. The first cross-section C110 may be positioned relatively closer to the inner surface 1103-1 than the second cross-section C111. The plurality of thermal management elements 1112-1, 1112-2, . . . , 1112-n may be distributed over at least a portion of the luminaire 1100.

Example luminaire 1100 includes a light engine 1120 coupled to drive electronics 1122. The thermal management structure 1102 may be configured to transfer thermal energy produced by the light engine 1120 and/or drive electronics 1122 from the luminaire 1100, as described herein. The first and second light transfer structures 1104-1, 1104-2 may be configured to receive light emitted from light engine 1120 and to transfer the received light out of the luminaire 1100. The light transfer structures 1104-1, 1104-2 may be transparent, partially transparent, translucent, opaque, and/or a combination thereof. The light transfer structures 1104-1, 1104-2 may be specular or diffuse, as described herein. In one nonlimiting example, the first light transfer structure 1104-1 may be configured to receive light energy from the light engine 1120 and transfer the received light energy to the second light transfer structure 1104-2. Continuing with this example, the second light transfer structure 1104-2 may then be configured to directly receive light emitted from the light engine 1120 and to indirectly receive light emitted from the light engine 1120 via the first light transfer structure 1104-1. In some embodiments, the light transfer structure(s) 1104-1 and/or 1104-2 may be configured to beam form light emitted from the light engine 1120, as described herein.

Thus, example luminaire 1100 may include a thermal management structure 1102, and first and second light transfer structures 1104-1, 1104-2. The thermal management structure 1102, and first and second structure light transfer structures 1104-1, 1104-2 may be formed during a same 3D printing process. It may be appreciated that the 3D printing process may facilitate formation of the free-form elements of the thermal management structure 1102.

Figure 11B:
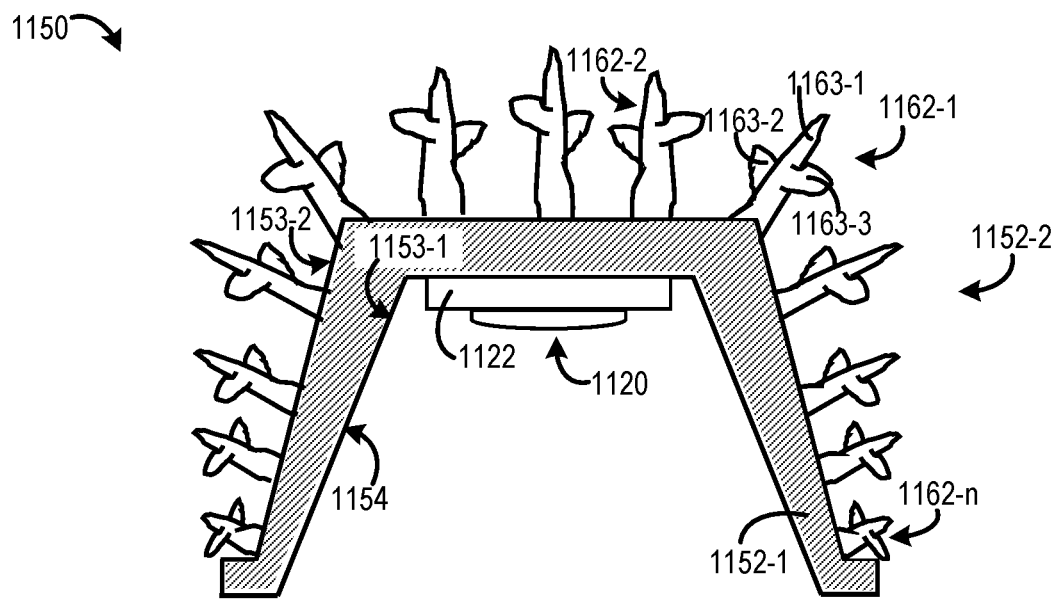
FIG. 11B is a sketch of a cross-section view of another example luminaire that includes integrated thermal management and light transfer structures, according to several embodiments of the present disclosure.

FIG. 11B is a sketch 1150 of a cross-section view of another example luminaire that includes integrated thermal management and light transfer structures, according to several embodiments of the present disclosure. Example luminaire 1150 includes a first thermal management structure 1152-1, a second thermal management structure 1152-2, and a light transfer structure 1154. The first thermal management structure 1152-1 and the second thermal management structure 1152-2 may be 3D printed of a single material or a composite material, as described herein. The first thermal management structure 1152-1 has a generally uniform inner surface 1153-1 and a generally uniform opposing outer surface 1153-2. In this example 1150, the first thermal management structure 1152-1 may be combined with the light transfer structure 1154, e.g., a portion of the inner surface 1153-1 may correspond to or be contiguous with the light transfer structure 1154.

The second thermal management structure 1152-2 includes a plurality of thermal management elements 1162-1, 1162-2, . . . , 1162-n. Each thermal management element 1162-1, 1162-2, . . . , 1162-n may be generally free-form. In some embodiments, at least some thermal management elements may be substantially solid 1162-1, 1162-2, . . . , and/or 1162-n. In some embodiments, at least some thermal management elements may be generally hollow 1162-1, 1162-2, . . . , and/or 1162-n. The plurality of thermal management elements 1162-1, 1162-2, . . . , 1162-n may be distributed over at least a portion of the luminaire 1150, generally along the outer surface 1153-2 of the first thermal management structure 1152-1.

In some embodiments, at least some thermal management elements, e.g., thermal management element 1162-1, may have one or more thermal management features. In one nonlimiting example, at least some thermal management elements, e.g., thermal management element 1162-1, may include a main portion 1163-1 and a plurality of thermal management features 1163-2, 1163-3. The main portion 1163-1 may extend from the outer surface 1153-2 of the first thermal management structure 1152-1. The plurality of thermal management features 1163-2, 1163-3 may then extend, at a non-zero angle, from the main portion 1163-1. The plurality of thermal management features 1163-2, 1163-3 are configured to provide an increased surface area for the thermal management element 1162-1.

Example luminaire 1150 includes a light engine 1120 coupled to drive electronics 1122. The thermal management structures 1152-1, 1152-2 may be configured to transfer thermal energy produced by the light engine 1120 and/or drive electronics 1122 from the luminaire 1150, as described herein. The light transfer structure 1154 may be configured to receive light emitted from light engine 1120 and to transfer the received light out of the luminaire 1150. The light transfer structure 1154 may be transparent, partially transparent, translucent, opaque, and/or a combination thereof. The light transfer structure 1154 may be specular or diffuse, as described herein. In some embodiments, the light transfer structure 1154 may be configured to beam form light emitted from the light engine 1120, as described herein.

Thus, example luminaire 1150 may include first and second thermal management structures 1152-1, 1152-2, and light transfer structure 1154. The first and second thermal management structures 1152-1, 1152-2, and the light transfer structure 1154 may be formed during a same 3D printing process. It may be appreciated that the 3D printing process may facilitate formation of the free-form elements of the second thermal management structure 1152-2.

Figure 12:
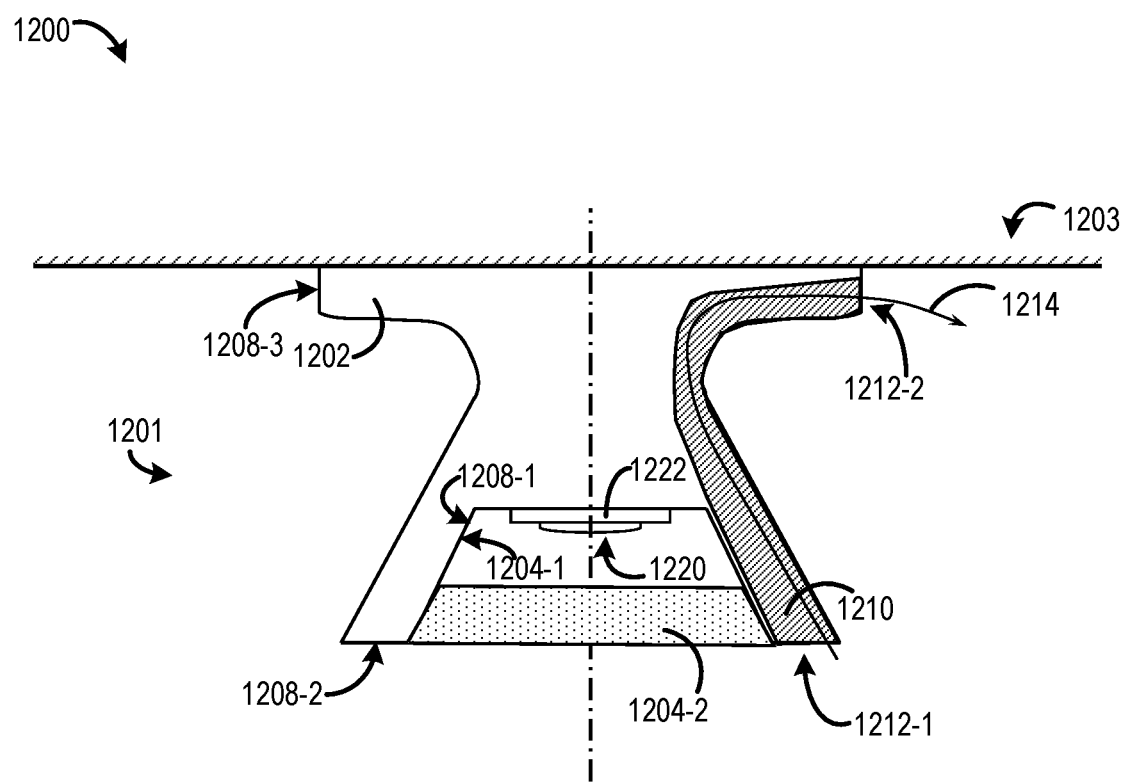
FIG. 12 is a cross-section view of another example luminaire that includes integrated thermal management and light transfer structures, illustrating convective air flow, according to several embodiments of the present disclosure.

FIG. 12 is a cross-section 1200 view of another example luminaire 1201 that includes integrated thermal management and light transfer structures, illustrating convective air flow, according to several embodiments of the present disclosure. View 1200 includes the example luminaire 1201 and a ceiling structure 1203. The ceiling structure 1203 may correspond to a ceiling region and/or one or more ceiling tile(s). The example luminaire 1201 may be coupled to the ceiling structure 1203.

Example luminaire 1201 includes a thermal management structure 1202, a first light transfer structure 1204-1, and a second light transfer structure 1204-2. The thermal management structure 1202 may be 3D printed of a single material or a composite material, as described herein. The thermal management structure 1202 has a generally uniform inner surface 1208-1. In this example 1201, the first light transfer structure 1204-1 may be combined with the thermal management structure 1202, e.g., may correspond to or be contiguous with the inner surface 1208-1 of the thermal management structure 1202.

The thermal management structure 1202 may define a thermal management feature 1210 configured to facilitate thermal management operation of the thermal management structure 1202. The thermal management feature 1210 may extend from a bottom surface 1208-2 of the thermal management structure 1202 to a top side surface 1208-3 of the thermal management structure 1202. The thermal management feature 1210 has a first opening 1212-1 defined in the bottom surface 1208-2 and a second opening defined in the top side surface 1212-2. In one nonlimiting example, the thermal management feature 1210 may be configured to facilitate convection airflow 1214 from the bottom surface 1208-2 to the top side surface 1208-3.

Example luminaire 1200 includes a light engine 1220 coupled to drive electronics 1222. The thermal management structure 1202 may be configured to transfer thermal energy produced by the light engine 1220 and/or drive electronics 1222 from the luminaire 1200, as described herein. The first and second light transfer structures 1204-1, 1204-2 may be configured to receive light emitted from light engine 1220 and to transfer the received light out of the luminaire 1200. The light transfer structures 1204-1, 1204-2 may be transparent, partially transparent, translucent, opaque, and/or a combination thereof. The light transfer structures 1204-1, 1204-2 may be specular or diffuse, as described herein. In one nonlimiting example, the first light transfer structure 1204-1 may be configured to receive light energy from the light engine 1220 and transfer the received light energy to the second light transfer structure 1204-2. Continuing with this example, the second light transfer structure 1204-2 may then be configured to directly receive light emitted from the light engine 1220 and to indirectly receive light emitted from the light engine 1220 via the first light transfer structure 1204-1. In some embodiments, the light transfer structure(s) 1204-1 and/or 1204-2 may be configured to beam form light emitted from the light engine 1220, as described herein.

Thus, example luminaire 1201 may include a thermal management structure 1202, and first and second light transfer structures 1204-1, 1204-2. The example luminaire 1201 may configured to facilitate convective air flow and thus thermal management of luminaire 1201 by thermal management structure 1202. The thermal management structure 1202 (including the thermal management feature 1210), and first and second light transfer structures 1204-1, 1204-2 may be formed during a same 3D printing process.

Figure 13A:
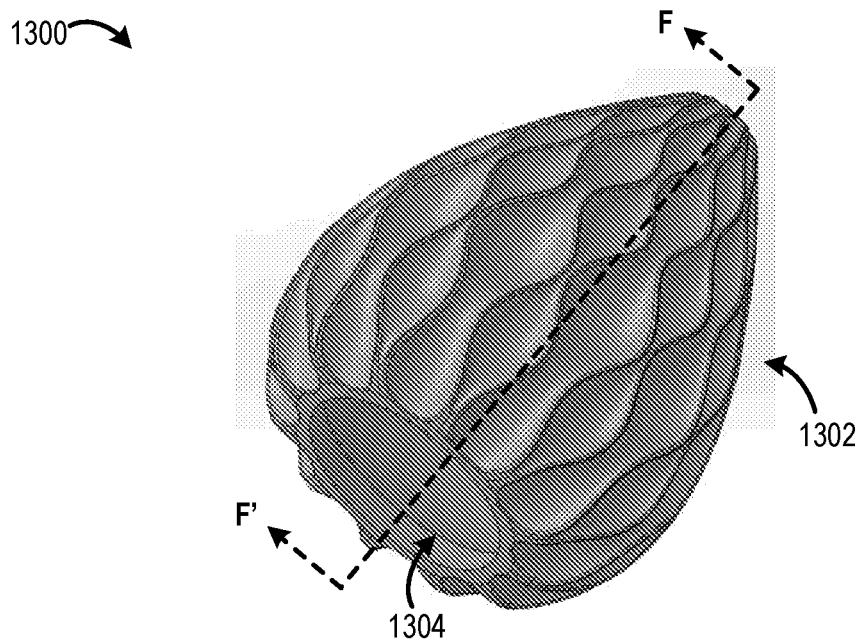
FIG. 13A is a sketch illustrating an isometric view of an example luminaire that includes integrated thermal management and light transfer structures and decorative features, according to several embodiments of the present disclosure.

FIG. 13A is a sketch 1300 illustrating an isometric view of an example luminaire that includes integrated thermal management and light transfer structures and decorative features, according to several embodiments of the present disclosure. Example luminaire 1300 includes an outer structure 1302 that may correspond to a thermal management structure, a light transfer structure, a decorative feature and/or a combination thereof (i.e., combined structure). The thermal management portion of the outer structure 1302 may be 3D printed of a single material or a composite material, as described herein. Example luminaire 1300 may define an opening 1304 configured to facilitate light transfer and/or thermal management, as described herein.

Figure 13B:
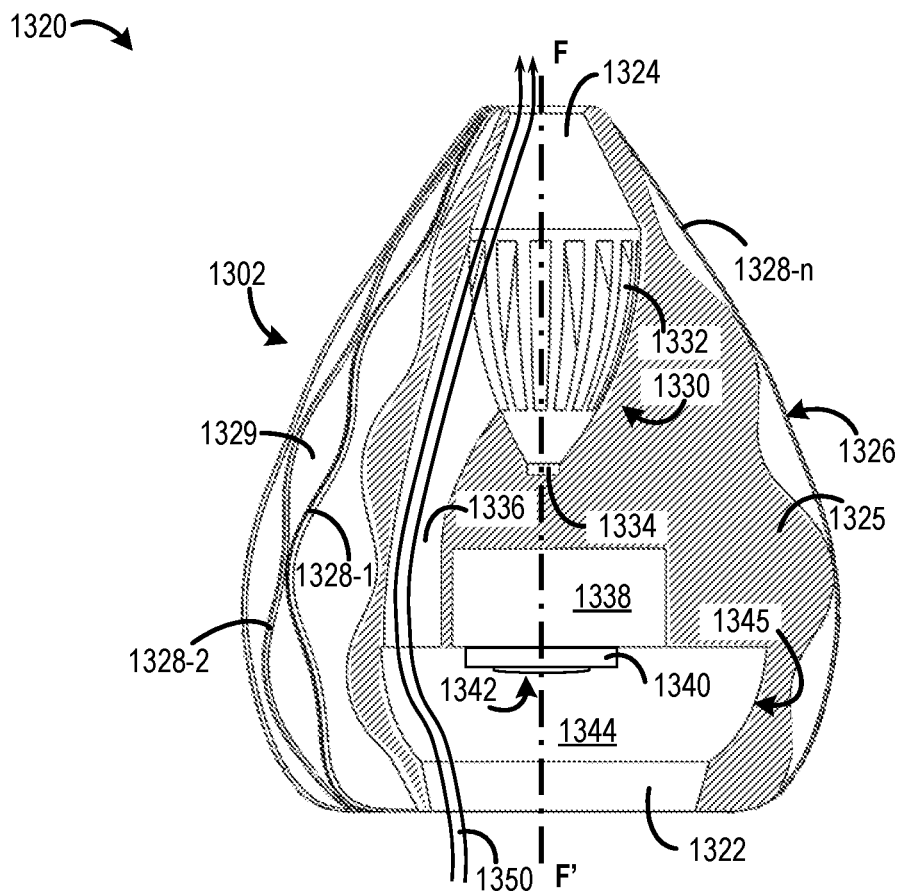
FIG. 13B is a 120 degree cross-section view of the example luminaire of FIG. 13A.

FIG. 13B is a 120 degree cross-section F-F' view 1320 of the example luminaire of FIG. 13A. Luminaire cross-section 1320 includes the combined outer structure 1302. The outer structure 1302 defines a bottom opening 1322, an opposing top opening 1324 and may define a first cavity 1325 positioned between the top opening 1324 and the bottom opening 1322. The first cavity 1325 may be filled, partially or completely, with an infill material, as will be described in more detail below.

The outer structure 1302 includes an outer surface 1326, positioned between the bottom opening 1322 and the top opening 1324. The outer surface 1326 includes a plurality of outer surface features 1328-1, 1328-2, . . . , 1328-*n*. Each outer surface feature 1328-1, 1328-2, . . . , 1328-*n* may generally extend between the bottom opening 1322 and the top opening 1324. The outer surface features 1328-1, 1328-2, . . . , 1328-*n* may be uniform (e.g., linear), non-uniform (e.g., curved, parabolic, nonlinear, serpentine, etc.) or a combination thereof. Each pair of adjacent outer surface features, e.g., outer surface features 1328-1 and 1328-2, may bound a respective outer surface sub-region, e.g., sub-region 1329. The sub-region 1329 may correspond to a channel with a variable depth measured from the outer surface features. In one nonlimiting example, the depth may be minimum at or near the outer surface features 1328-1 and 1328-2 and maximum halfway between the adjacent outer surface features 1328-1 and 1328-2. However, this disclosure is not limited in this regard. A shape of a cross-section of the sub-region may be curved, circular, parabolic, rectangular, trapezoidal, free-form, etc. The outer surface 1326, including the outer surface features and outer surface sub-regions may be configured to facilitate thermal management, and/or light transfer, and/or may correspond to decorative features.

Luminaire 1320 further includes a thermal management structure 1330 positioned within the first cavity 1325 between the bottom opening 1322 and the top opening 1324. In this example 1320, the thermal management structure 1330 is positioned with a first end at or near the top opening 1324, and a bottom end bounded by a detail 1334 configured to facilitate mounting the luminaire. In one nonlimiting example, the mounting detail 1334 may be an interface between the luminaire 1320 and a mounting rod that extends out of the top opening 1324 to a ceiling structure. However, this disclosure is not limited in this regard. The thermal management structure 1330 defines a plurality of openings, e.g., slot 1332.

Luminaire 1320 further defines a second cavity 1336 that extends from the bottom opening 1322 to the top opening 1324, with a portion contiguous with thermal management structure 1330. The bottom opening 1322, top opening 1324, second cavity 1336, and thermal management structure 1330 may be configured to facilitate thermal management of the luminaire 1320. For example, the bottom opening 1322, top opening 1324, second cavity 1336, and thermal management structure 1330 (including slots, e.g., slot 1332) may be configured to facilitate airflow, e.g., airflow 1350, into and out of the luminaire 1320. In one nonlimiting example, the airflow 1350 may be convective.

Luminaire 1320 further includes drive electronics 1338, a light source base (e.g., substrate) 1340, and a light source 1342 (e.g., LED array). The drive electronics 1338, light source base 1340, and light source 1342 may be positioned in the first cavity 1325, generally below the thermal management structure 1330. In some embodiments, luminaire 1320 may further include a light transfer element 1344. The light transfer element 1344 may be positioned in the first cavity 1325 generally below the thermal management structure 1330. In some embodiments, at least the light source 1342 may be positioned within the light transfer element 1344. The light transfer element 1344 may be bounded by a wall 1345. In some embodiments, the wall 1345 may include multiple layers. In one nonlimiting example, the light transfer element 1344 may be a light mixing and interactive cavity. However, this disclosure is not limited in this regard. The bottom opening 1322 and light transfer element 1344 may be configured to receive light emitted from the light source 1342 and to transfer the received light out of the luminaire 1320. Light transfer element 1344 may be further configured to mix the received light and/or improve light output characteristics.

The first cavity 1325 may be filled, partially or completely, with an infill material. Characteristics of the infill material may include, but are not limited to, material type, infill pattern, infill percentage, etc. The infill material characteristics may be managed and/or adjusted by or during the 3D printing process. Adjusting the infill material characteristics may result in a change in thermal management and/or light transfer properties of the combined luminaire 1320.

Thus, example luminaire 1300, 1320 includes outer structure 1302 that may correspond to a thermal management structure, a light transfer structure, a decorative feature and/or a combination thereof (i.e., combined structure), and that may be formed during a same 3D printing process.

Thus, there is disclosed herein three-dimensional (3D) printed integrated thermal management and light transfer structures. The integrated thermal management and light transfer structures may be included in a luminaire (i.e., light fixture). The thermal management structure may be configured to manage a thermal output from one or more sources including, but not limited to, a light source (e.g., a light engine including one or more LED(s), drive electronics, etc.). The light transfer structure may be configured to facilitate transmission of light energy emitted by the light source, out of the luminaire and onto a lighting target. Function(s) of the light transfer structure may include, but is(are) not limited to, tailoring a beam distribution of the luminaire, i.e., beam forming (e.g., lighting application-specific beam forming), increasing efficacy of the luminaire, providing or enhancing decorative aspects of the luminaire, etc.

The thermal management structure and light transfer structure may be manufactured in a same 3D printing process. In an embodiment, the thermal management structure and light transfer structure may be separate structures manufactured into a single 3D printed component during the 3D manufacturing process. The single 3D printed component may then include a plurality of portions with at least one portion corresponding to the thermal management structure and at least one other portion corresponding to the light transfer structure. In this embodiment, the thermal management structure and light transfer structure are each configured to maintain a respective, independent functionality. In another embodiment, the thermal management structure and light transfer structure may be combined into a same 3D printed component. In this embodiment, the thermal management structure and light transfer structure may correspond to the same 3D printed component. Combining different subassemblies into integrated 3D printed component (i.e., integrated structure) can reduce an overall fixture manufacturing cost. It may be appreciated that using 3D printing to create luminaires has many benefits including, but not limited to, being available on-demand, facilitating creation of custom luminaires, and/or on-site manufacturability. Additionally or alternatively, benefits may further include reducing a number of parts when manufacturing a luminaire that may then result in significant cost reduction. Additionally or alternatively, benefits may further include reduced labor and/or increased manufacturing consistency.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A lighting apparatus comprising:
 a light transfer structure configured to receive light from at least one light emitting diode (LED), the light transfer structure comprising at least one light transfer feature; and
 at least one thermal management structure configured to manage a thermal energy of the at least one LED, wherein the at least one thermal management structure comprises one or more thermal management elements, at least one of the one or more thermal management elements having thermal management features configured to facilitate heat transfer from the at least one LED,
 wherein the light transfer structure and the thermal management structure are formed at the same time during a same three-dimensional (3D) printing process and in which the light transfer structure and the thermal management structure are integrated with one another as a combined structure, and wherein the thermal management structure further comprises two or more concentric structures, each of the concentric structures being separated from one another by voids, at least one of the two or more concentric structures comprising one or more channels or voids as a thermal management feature for directing airflow.

2. The lighting apparatus of claim 1, wherein the light transfer structure is selected from the group comprising a reflector, a diffuser, and a lens.

3. The lighting apparatus according to claim 1, wherein at least one of the light transfer structure and/or the thermal management structure comprises a decorative feature.

4. The lighting apparatus according to claim 1, wherein a surface of the light transfer structure is specular or diffuse.

5. The lighting apparatus according to claim 1, wherein each thermal management element comprises a polymer and a plurality of thermally conductive particles.

6. The lighting apparatus according to claim 1, wherein each thermal management element comprises a composite material.

7. The lighting apparatus of claim 6, wherein the composite material comprises a first material and a second material, the second material configured to enhance a thermal conductivity of each thermal management element.

8. The lighting apparatus according to claim 1, wherein the two or more concentric structures comprises two or more concentric cylinders.

9. The lighting apparatus according to claim 1, wherein the two or more concentric structures comprises two or more hemispherical shells disposed in spaced relation.

10. A luminaire comprising:
 a light engine comprising at least one light emitting diode (LED);
 a light transfer structure configured to receive light from the light engine; and
 a thermal management structure configured to manage a thermal energy of the light engine, and wherein the thermal management structure comprises one or more thermal management elements, at least one of the one or more thermal management elements including one or more thermal management features that are configured to facilitate heat transfer from the light engine,
 wherein the light transfer structure and the thermal management structure are formed at the same time during a same three-dimensional (3D) printing process and in which the light transfer structure and the thermal management structure are integrated with one another as a combined structure wherein the thermal management structure comprises two or more concentric structures, each of the two or more concentric structures being separated from one another by voids, at least one of the two or more concentric structures comprising one or more channels or voids as a thermal management feature for directing airflow.

11. The luminaire of claim 10, wherein the light transfer structure is selected from the group comprising a reflector, a diffuser, and a lens.

12. The luminaire according to claim 10, wherein at least one of the light transfer structure and/or the thermal management structure comprises a decorative feature.

13. The luminaire according to claim 10, wherein a surface of the light transfer structure is specular or diffuse.

14. The luminaire according to claim 10, wherein-each thermal management element comprises a polymer and a plurality of thermally conductive particles.

15. The luminaire according to claim 10, wherein each thermal management element comprises a composite material.

16. The luminaire of claim 15, wherein the composite material comprises a first material and a second material, the second material configured to enhance a thermal conductivity of each thermal management element.

17. The luminaire according to claim 10, wherein the two or more concentric structures comprises two or more concentric cylinders.

18. The luminaire according to claim 10, wherein the two or more concentric structures comprises two or more hemispherical shells disposed in spaced relation.

19. A lighting apparatus comprising:
a light transfer structure configured to receive light from at least one light emitting diode (LED), the light transfer structure comprising at least one light transfer feature; and
at least one thermal management structure configured to manage a thermal energy of the at least one LED, wherein the at least one thermal management structure comprises one or more thermal management elements, at least one of the one or more thermal management elements having thermal management features configured to facilitate heat transfer from the at least one LED,
wherein the light transfer structure and the thermal management structure are formed at the same time during a same three-dimensional (3D) printing process and in which the light transfer structure and the thermal management structure are integrated with one another as a combined structure, and wherein the thermal management structure further comprises at least one hemispherical shaped element having a top opening and the light transfer structure comprises a hemispherical shaped element having a bottom surface, the hemispherical shaped elements of the thermal management structure and the light transfer structure being integrally joined at a neck.

20. A luminaire comprising:
a light engine comprising at least one light emitting diode (LED);
a light transfer structure configured to receive light from the light engine; and
a thermal management structure configured to manage a thermal energy of the light engine, and wherein the thermal management structure comprises one or more thermal management elements, at least one of the one or more thermal management elements including one or more thermal management features that are configured to facilitate heat transfer from the light engine,
wherein the light transfer structure and the thermal management structure are formed at the same time during a same three-dimensional (3D) printing process and in which the light transfer structure and the thermal management structure are integrated with one another as a combined structure, and wherein the thermal management structure further comprises at least one hemispherical shaped element having a top opening and the light transfer structure comprises a hemispherical shaped element having a bottom surface, the hemispherical shaped elements of the thermal management structure and the light transfer structure being integrally joined at a neck.

* * * * *